(12) United States Patent
Rangan

(10) Patent No.: US 10,438,172 B2
(45) Date of Patent: Oct. 8, 2019

(54) AUTOMATIC RANKING AND SCORING OF MEETINGS AND ITS ATTENDEES WITHIN AN ORGANIZATION

(71) Applicant: Clari, Inc., Mountain View, CA (US)

(72) Inventor: Venkat Rangan, Los Altos Hills, CA (US)

(73) Assignee: CLARI INC., Sunnyvale, CA (US)

( * ) Notice: Subject to any disclaimer, the term of this patent is extended or adjusted under 35 U.S.C. 154(b) by 860 days.

(21) Appl. No.: 14/820,177

(22) Filed: Aug. 6, 2015

(65) Prior Publication Data

US 2017/0039527 A1     Feb. 9, 2017

(51) Int. Cl.
*G06Q 10/00* (2012.01)
*G06Q 10/10* (2012.01)

(52) U.S. Cl.
CPC ................ *G06Q 10/1095* (2013.01)

(58) Field of Classification Search
None
See application file for complete search history.

(56) References Cited

U.S. PATENT DOCUMENTS

| | | | | |
|---|---|---|---|---|
| 2007/0005406 A1* | 1/2007 | Assadian | ............ | G06Q 10/109 705/7.18 |
| 2008/0300937 A1* | 12/2008 | Allen | ................ | G06Q 10/109 705/7.33 |
| 2009/0132329 A1* | 5/2009 | Lam | ............... | G06Q 10/06311 705/7.13 |
| 2009/0165022 A1* | 6/2009 | Madsen | ............... | G06Q 10/109 719/318 |
| 2011/0320235 A1* | 12/2011 | Bak | ................ | G06Q 10/1095 705/7.19 |
| 2012/0117153 A1* | 5/2012 | Gunasekar | ............ | G06F 17/289 709/204 |
| 2013/0282421 A1* | 10/2013 | Graff | .................. | G06Q 10/1093 705/7.18 |
| 2014/0187213 A1* | 7/2014 | Shuster | ................. | H04W 4/023 455/414.1 |
| 2014/0188541 A1* | 7/2014 | Goldsmith | ............ | G06Q 10/06 705/7.19 |
| 2014/0278071 A1* | 9/2014 | San Filippo | ....... | G01C 21/3423 701/465 |

(Continued)

OTHER PUBLICATIONS

Minkov, Einat, An Email and Meeting Assitant using Graph Walks, Carnegie Mellon University, p. 1-7.*

*Primary Examiner* — Joseph M Waesco
(74) *Attorney, Agent, or Firm* — Womble Bond Dickinson (US) LLP

(57) ABSTRACT

Systems and methods are provided for analyzing a history of meetings, the attendees, date of occurrence, and other content to determine the value of the meetings and the attendees. The importance of people and the meetings they attend can be derived based on patterns of attendees. In one embodiment, the meta-data of meetings and the attendees can be used to determine value without requiring time-consuming manual steps or manual evaluation of people and their titles. A graph of meetings and its attendees can be generated and used by one or more automated software agents to place value to the content of the meeting, its agenda, and other meeting collateral such as meeting briefs/attachments of meetings. Accordingly, embodiments dramatically reduce the need for human examination of meeting history.

20 Claims, 28 Drawing Sheets

(56) References Cited

U.S. PATENT DOCUMENTS

| | | | |
|---|---|---|---|
| 2014/0278086 A1* | 9/2014 | San Filippo | G01C 21/3423 701/527 |
| 2014/0358632 A1* | 12/2014 | Graff | G06F 16/9537 705/7.29 |
| 2015/0006218 A1* | 1/2015 | Klemm | G06Q 10/1095 705/7.19 |
| 2015/0006221 A1* | 1/2015 | Mermelstein | G06Q 10/1093 705/7.19 |
| 2015/0074558 A1* | 3/2015 | Haskins | G06F 16/245 715/753 |
| 2015/0156606 A1* | 6/2015 | Shuster | H04W 4/023 455/414.3 |
| 2015/0278730 A1* | 10/2015 | Goldsmith | G06Q 10/06 705/7.28 |
| 2016/0255466 A1* | 9/2016 | Shuster | H04W 4/023 455/414.3 |
| 2016/0275458 A1* | 9/2016 | Meushar | G06Q 10/109 |
| 2016/0350720 A1* | 12/2016 | Moorjani | G06Q 10/1095 |
| 2017/0039527 A1* | 2/2017 | Rangan | G06Q 10/1095 |

\* cited by examiner

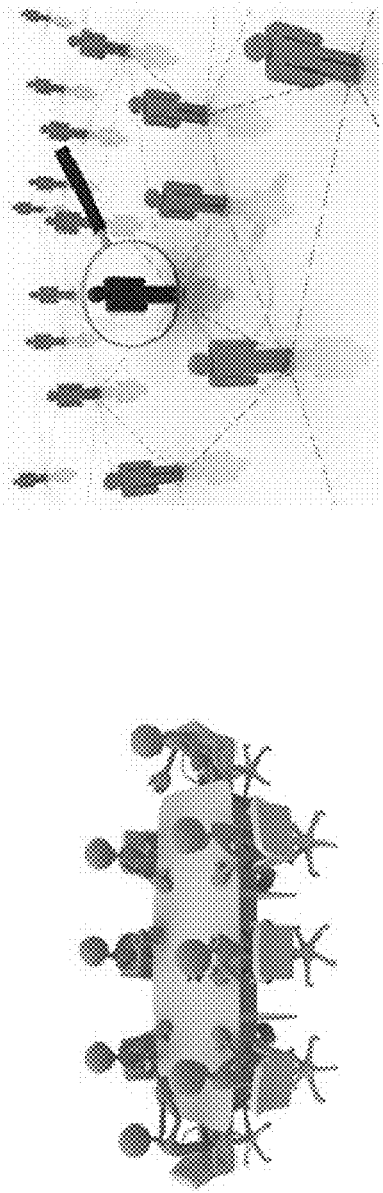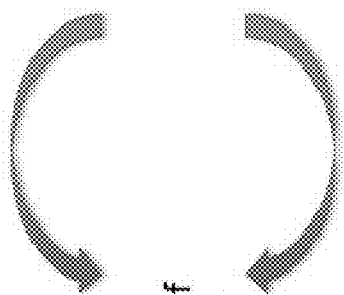
FIG. 12A

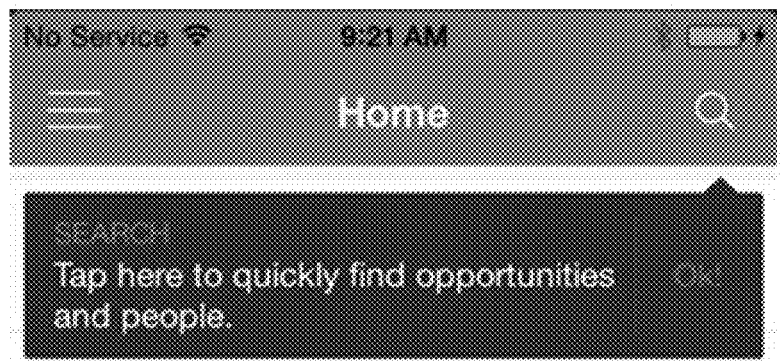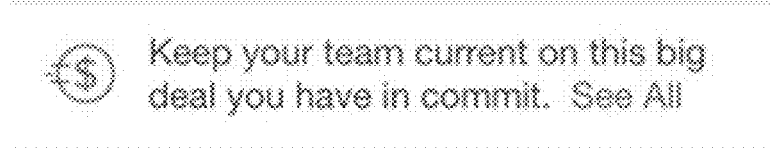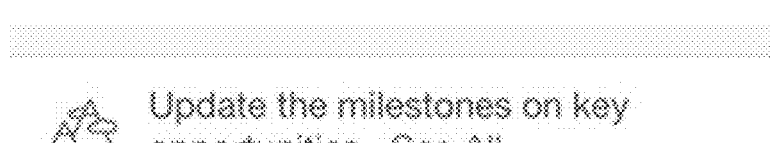
FIG. 16A

AUTOMATIC RANKING AND SCORING OF MEETINGS AND ITS ATTENDEES WITHIN AN ORGANIZATION

BACKGROUND OF THE INVENTION

A. Field of the Invention

This disclosure relates to systems and methods for ranking and scoring importance of meetings and attendees.

B. Background

Professional workers rely on critical and timely information to complete their day-to-day work and be productive. This information can be scattered all over the information technology (IT) infrastructure hidden in enterprise applications, in on-premise information stores, and in new cloud-based environments. Delivering mission critical data to these professionals can be an important IT function. However, as these professionals encounter data in their business contexts, the professionals can be constantly bombarded with information flow from several sources each adding to the problem of information explosion. Some users are able to organize this mass of data manually. Other users can experience a loss of productivity, as they are unable to organize the data in a meaningful way, an experience that manifests itself as frustration and many hours of trying to find and put the pieces together. In both cases, there can be a great risk of missing the critical information that is needed for effective business decisions.

There can be significant value gained by understanding the importance of meeting attendees and the importance of meetings they attend. Organizations can spend large amount of resources for organizing and conducting meetings. It can be valuable to know the value of these meetings. Additionally, organizations tend to evaluate value of meetings based on the outcome of the meeting. Such evaluations fail to be truly objective, as they are not based on true value of attendees of meetings. Some solutions attempt to solve this problem by assigning titles, roles, and responsibilities to individuals. Thus, the importance of meetings, the agenda of the meeting, and its value to the organization is simply based on title hierarchy. These solutions also rely too much on manual input to judge or derive importance of meetings and the attendees.

Accordingly, what is desired is to solve problems relating to information explosion, some of which may be discussed herein. Additionally, what is particularly desired is to reduce drawbacks relating to ranking and scoring importance of meetings and attendees, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Organizations typically conduct meetings with people (meeting attendees) with a specified agenda. Embodiments of this disclosure seek to derive the importance of meeting, any attendees, and the topic of the meeting by automatically determining a scoring algorithm and by applying graph theoretical principles. In one embodiment, a history of meetings, the attendees, date of occurrence, and other content can be analyzed to determine the value of the meetings and the attendees. The importance of people and the meetings they attend can be derived based on patterns of attendees. In one embodiment, the meta-data of meetings and the attendees can be used to determine value without requiring time-consuming manual steps or manual evaluation of people and their titles. A graph of meetings and its attendees can be generated and used by one or more automated software agents to place value to the content of the meeting, its agenda, and other meeting collateral such as meeting briefs/attachments of meetings. Accordingly, embodiments dramatically reduce the need for human examination of meeting history.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 12A is an illustration of calendar data analysis according to one embodiment of the present invention.

FIGS. 16A-16G are screenshots of various user interfaces for presenting opportunities determined from calendar analytics in one embodiment according to the present invention.

DETAILED DESCRIPTION OF THE INVENTION

Figure 1:
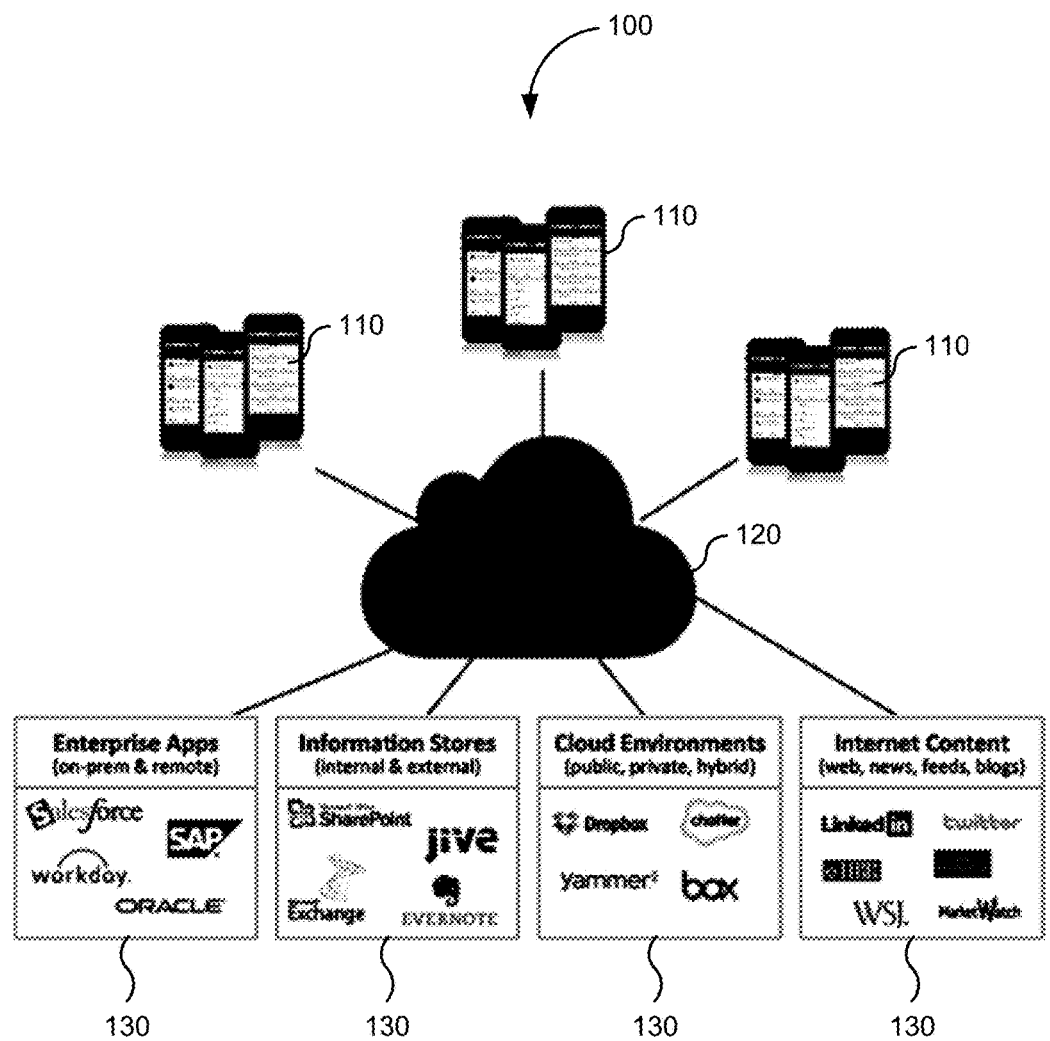
FIG. 1 is a block diagram of an information discovery and curation system according to one embodiment of the present invention.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

I. Introduction

Embodiments relate to a highly available cloud-resident service. The service understands each user's "knowledge consumption profile." A knowledge consumption profile as used herein refers to daily activities in which a user engages in a business context. Examples of activities are preparing for a customer meeting, or a partner review, or a business operations review, or responding to information request that came in from an email or even for ad-hoc research related to a task or a critical business problem. The service offers information discovery and curation for such activities through highly customizable and automated business process workflows. The service incorporates a comprehensive delivery mechanism that includes a variety of information interaction paradigms such as mobile devices, desktop/laptop devices using both native applications and web browser based content applications. Accordingly, content relevant to a user's activity or task can be delivered to the user's mobile device. In one embodiment, the user's activity or task can be scored according to relevance, prioritized according to opportunity, or the like.

II. Information Discovery and Curation

A. Cloud-Based Solution

In one embodiment, a cloud-resident service manages knowledge consumption profiles for users of an enterprise based on advanced analytics of both structured and unstructured data, from sources within the enterprise as well as sources external to the enterprise. As part of building a user's profile, common patterns in a user's access or activity can be discovered and used to build a business interest graph (knowledge graph). The graph can model content that is contextually relevant for a particular business activity. In one embodiment, contextual relevance can be established using three components—a user's past history, content similarity, and other similar user's history. Given a certain task, the most relevant content is surfaced based on an analysis of the three components. The relevant tasks themselves are identified by the user's profile, which then identifies the role of the user in the organization. Using this role, specific events such as meetings in the individual's calendar, research tasks, information requests that come in over email from peers or customers, and other items of importance can be identified.

The cloud-resident service can facilitate a wide range of activities that can form part of user profiles, corresponding task events, and the information needs for each task. In one embodiment, templates of information retrieval and curation definitions can be specified. Templates can be defined for user roles, e.g., using a template definition language. In one embodiment, on-going refinement of templates for each role is driven by an automated machine learning component. This automation layer makes it possible for the service to continuously learn and adapt based on usage patterns. Such learning can be varied from learning to include or exclude a certain repository from information retrieval consideration.

In various embodiments, the cloud-resident service can assist a sales professional preparing for a first meeting with a customer prospect for advancing a direct sale. Typical preparation steps would be the following:
a) Identify meeting participants in the sales meeting, both external and internal.
b) Determine the roles of each participant from the meeting perspective—i.e., are they a sponsor of the meeting, vs. evaluator vs. supporting individual vs. business strategist/ architect etc. Also, determine if there is a committee involved in the purchase decision.
c) Determine their titles and their role using a public source such as LinkedIn.
d) Identify any prior discussions such as the source of the sales lead.
e) Determine the product/solution the customer is looking to purchase, what potential solution benefits the customer is looking for etc.
f) Determine any potential competitors who may have contacted the prospect, and identify the strengths and weaknesses of the competition relative to your solution.
g) Identify any public information for the external participants such as any recent posts to Twitter, Quora or other sites. Also, validate the connections in LinkedIn for the individuals.
h) Collect public information about the customer such as any recent news items, press releases etc.
i) Collect internal collateral for specific solution and prepare to offer them to the prospect.

Typically, many of the above tasks require repeated application of the following.
a) Some number of searches in various repositories and content sources. For complex meetings, a few hundred searches is not uncommon.
b) Several copy-paste operations, copying tidbits of information from each search result into an information document (word doc with bullets or an email).
c) Searching through emails for prior email exchanges—quite often, content repositories such as Salesforce do not contain information that is most relevant, since discussions during the collaborative phase occur outside the finalized record of Salesforce.
d) Searching through any recorded news feeds, social feeds (such as Chatter or Yammer).
e) Looking through structured information repositories such as Salesforce opportunity database.
f) Enquiring others in your team who may have knowledge or expertise on similar tasks.

Given that each step is manual and time consuming, several meetings between the sales professional and the prospective customer can occur without the most relevant information being available to guide each meeting. In contrast, the cloud-resident service can automate the above steps by utilizing an information retrieval and curation workflow. Using the above scenario, the cloud-resident service, e.g., works in the background on behalf of the sales professional to:
a) Automatically retrieve all the meetings in the sales professional's calendar. The cloud-resident service can identify, for the particular meeting with the customer prospect, the participants.
b) Automatically classify the participants as internal or external, using both heuristics as well as machine learning based on past data. In one embodiment, for each participant, an email address in a meeting invitation can be used to identify the domain of the email. The domain can then be matched against a map of domain-to-accounts.
c) For each external participant, identify their LinkedIn information and extract their current role, as well as the role that established a connection with them.
d) Formulate searches of the sales professional's email and other information repositories with both keywords from the meeting as well as from other emails that these participants are involved in.
e) Extract specific records from enterprise applications, e.g., Salesforce, that the sales professional has access to that are relevant to the specific customer prospect. The cloud-resident service can identify records as either notes from prior meetings as well as whether they are critical items for a successful meeting.
f) Search similar records from other sales professional's for the same product. Also, the cloud-resident service can gather any prior history with other products with the customer.
g) Search the public web for news articles for the customer.
h) Search public company databases such as Jigsaw to identify competitors that sell similar products.
i) Search public forums where competitive products are discussed to get a sentiment for these products.
j) Pull together any internal databases or repositories (such as SharePoint, Confluence) that may contain recent competitive discussions, along with any win-loss reports involving this competitor.

As each content source is searched, the cloud-resident service automatically sifts through the results and offers just the most relevant content, curating the results as necessary. As an example, the LinkedIn profile for an external participant may contain a dozen work history entries, but only two are relevant. The cloud-resident service can pull just that content.

The cloud-resident service can deliver curated content in the form of an "information packet" ready to be consumed on the sales professional's mobile device. The cloud-resident service can track which part of the curated content in the information packet that the user actually reviews as well as any special tags such as content Likes/content feedback. This closed look evaluation initiates a learning process. By delivering the right information at the right time, the cloud-resident service relieves the stress of the sales professional of getting ready for the next activity. The cloud-resident service seeks to generate an information packet by a process that seeks to ensure that the retrieval and curation is comprehensive and does not leave out critical sources of data.

FIG. 1 is a block diagram of information discovery and curation system 100 according to one embodiment of the present invention. System 100 can include modern applications that are based on advanced architectures that combine the power of a flexible compute and I/O platform in the cloud with powerful native applications. System 100 can be implemented in a public cloud or a private cloud, depending on security and privacy needs of an enterprise.

In this example, system 100 includes client devices 110, cloud service 120, and data sources 130. Client devices 110 may be each embodiment as a single device, a single computer system, multiple devices, or multiple computer systems. In various aspects, client devices 110 although labeled differently for convenience can each be embodied as a mobile device, a wearable device, or other device (e.g., a laptop, palmtop, mobile phone, smart phone, multimedia phone, portable media player, GPS unit, mobile gaming systems, etc.). In addition to or in the alternative, client devices 110 can be embodied as personal computer systems, mainframes, server computer systems, cloud services, or the like. Client devices may include a variety of technologies that provide a communications connection with cloud service 120. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.). Client devices 110 can host one or more of a variety of client applications that communicate with one or more server applications provided by cloud service 120 or data sources 130. These client applications may include applications specific to the intended function of a device (such as telephony applications or GPS applications) as well as e-mail clients, update/upgrade clients, news clients, web/blog clients, podcast clients, social networking clients, or other types of client applications where content may be sent.

Cloud service 120 can provide information discovery and curation from data sources 130 as well as information package delivery to content devices 110. Cloud service 120 can be implemented using a single server computer system or may include multiple server computer systems, web servers, application servers, networks, interconnects, or the like. Cloud service 120 can provide content to client devices 110 as well as to other devices and entities (not shown). Examples of content include a text message, a multimedia message, image or video data, an impending calendar event, an audio/video call (e.g., using VOIP), a notification of new data on a remote server, or an information package containing relevant information for a user's daily activities. In certain embodiments, content can originate from one or more sources internal to cloud service 120. In certain embodiments, content can be provided directly by cloud service 120 to client devices 110. In some embodiments, content can originate from one or more other sources. For example, content may originate from data sources 130.

Cloud service 120 can route content to client devices 110. In some embodiments, cloud service 120 may manage the transfer of an email message, a voice call, or the like. In certain embodiments, cloud service 120 can send content to more than one device, when appropriate. Cloud service 120 can include push notification services that in addition to or in the alternative of routing content implement mechanisms to let users of client devices 110 know that new content is available at one or more server applications, is on the device, or is incoming. One or more server computers of cloud service 120 can provide, provision, manage, and otherwise operate the push notification service.

Data sources 130 can provide information storage services. Data sources 130 can be implemented using a single server computer system or may include multiple server computer systems, web servers, application servers, networks, interconnects, or the like. Examples of information storage services include enterprise applications, information stores, cloud environments, Internet content (web, news, feeds, blogs), or the like.

Figure 2:
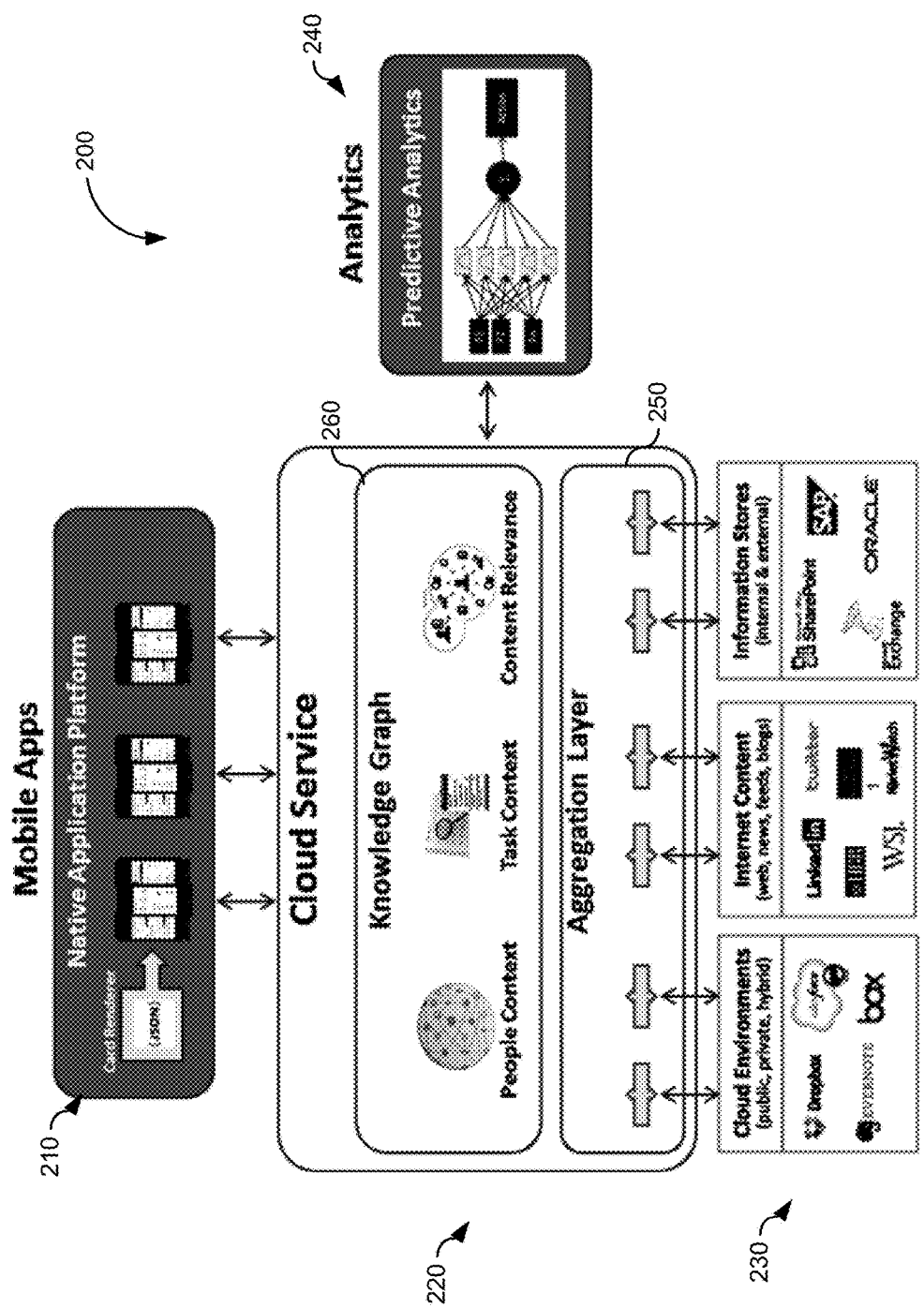
FIG. 2 is a block diagram of components of the information discovery and curation system according to one embodiment of the present invention

FIG. 2 is a block diagram of components of information discovery and curation system 200 according to one embodiment of the present invention. In this example, system 200 includes client devices 210, cloud service 220, data sources 230, and analytics system 240. Client devices 210, cloud service 220, and data sources 230 can be embodied similarly to the above description of FIG. 1.

Cloud service 220 can include aggregation layer 250 and knowledge graph 260. Aggregation layer 250 can include hardware and/or software elements that discover information from data sources 130. Aggregation layer 250 also perform indexing, caching, curation, and aggregation services. For example, aggregation layer 250 can perform content analysis to extract content and build a search index. Aggregation layer 250 may perform content curation to collect individual items of information, which is normalized into an attractive information package. Aggregation layer 250 may provide data management for persistence, scaling and distribution of content such as user profiles, machine learning algorithm analysis results etc.

Knowledge graph 260 can include a business interest graph that maintains relationships between users and content and is able to answer questions such as the group of users that have similar content interest, as well as groups of content that is accessed in response to a task or information request. This may include results of analytics system 240 such as collaboration filtering algorithms, support vector machine based classifier, clustering algorithms (canopy clustering and kMeans clustering), kNN nearest neighbor algorithm and singular value decomposition algorithm for eliminating noise in the data. Aggregation layer 250 can launch various periodic tasks such as updating knowledge graph 260 based on receiving new content from data sources 230.

In various embodiments, user visible functionality of cloud service 220 is delivered through end user applications on client devices 210, e.g., native mobile applications. Native applications can be provided for iPhone (iOS) or Android user experience as well as optimized delivery for touch-sensitive platforms such as iPad, iPhone. Also, deliver applications using traditional web model using HTML5 and CSS3.

Figure 3:
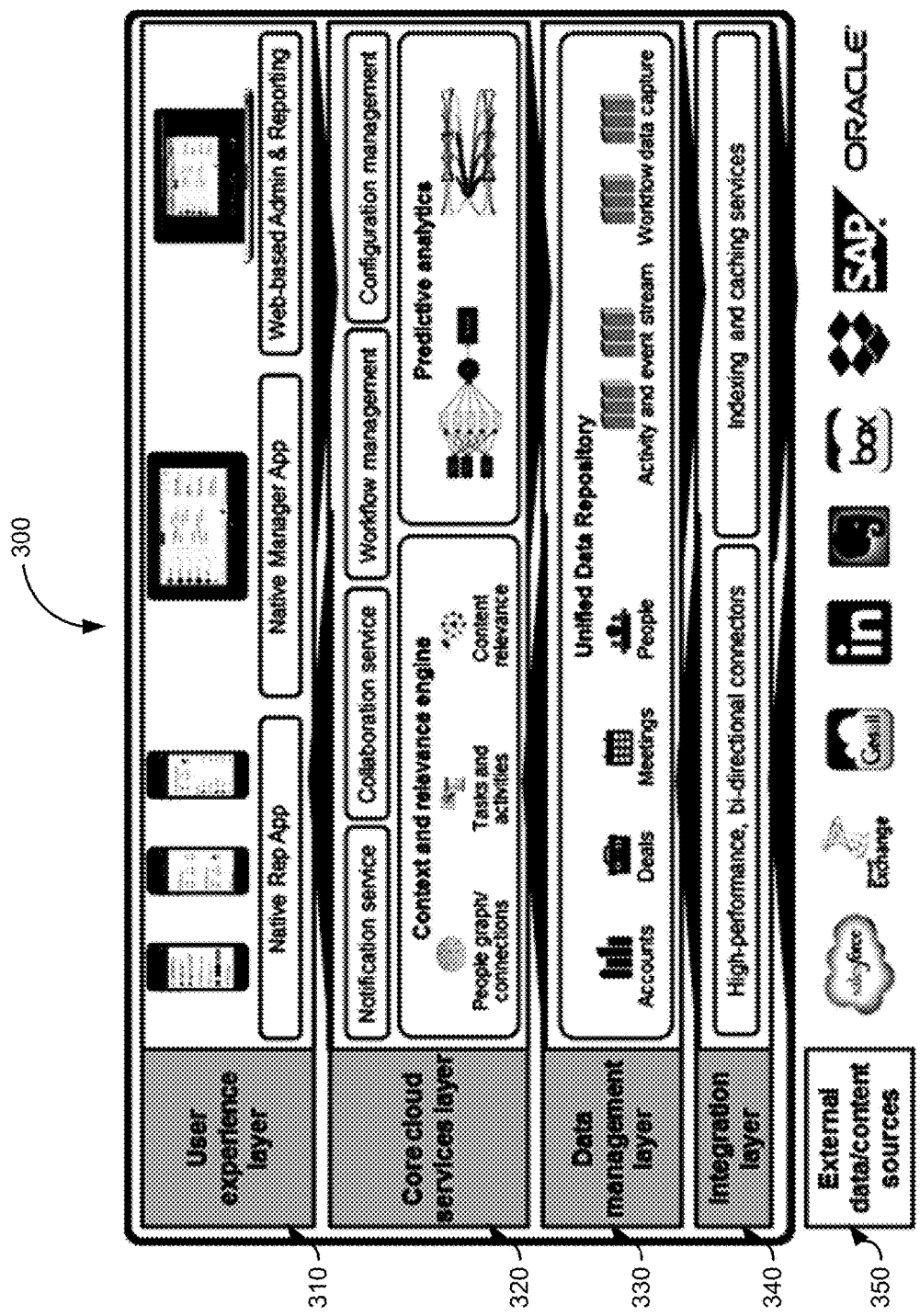
FIG. 3 is a block diagram of layers of the information discovery and curation system according to one embodiment of the present invention.

FIG. 3 is a block diagram of layers of information discovery and curation system 300 according to one embodiment of the present invention. In this example, system 300 includes user experience layer 310, core cloud services layer 320, data management layer 330, integration layer 340, and external data/content layer 350.

Information discovery and curation system 300 can deliver curated content in the form of an "information packet" ready to be consumed via user experience layer 310. System 300 can track which part of the curated content in the information packet that the user actually reviews as well as any special tags such as content Likes/content feedback. System 300 can initiate a learning process in cloud services layer 320 based on the feedback. By delivering the right information at the right time, system 300 relieves the user stress of getting ready for the next activity by ensuring that the retrieval, integration, and curation is comprehensive and does not leave out critical sources of data.

Figure 4:
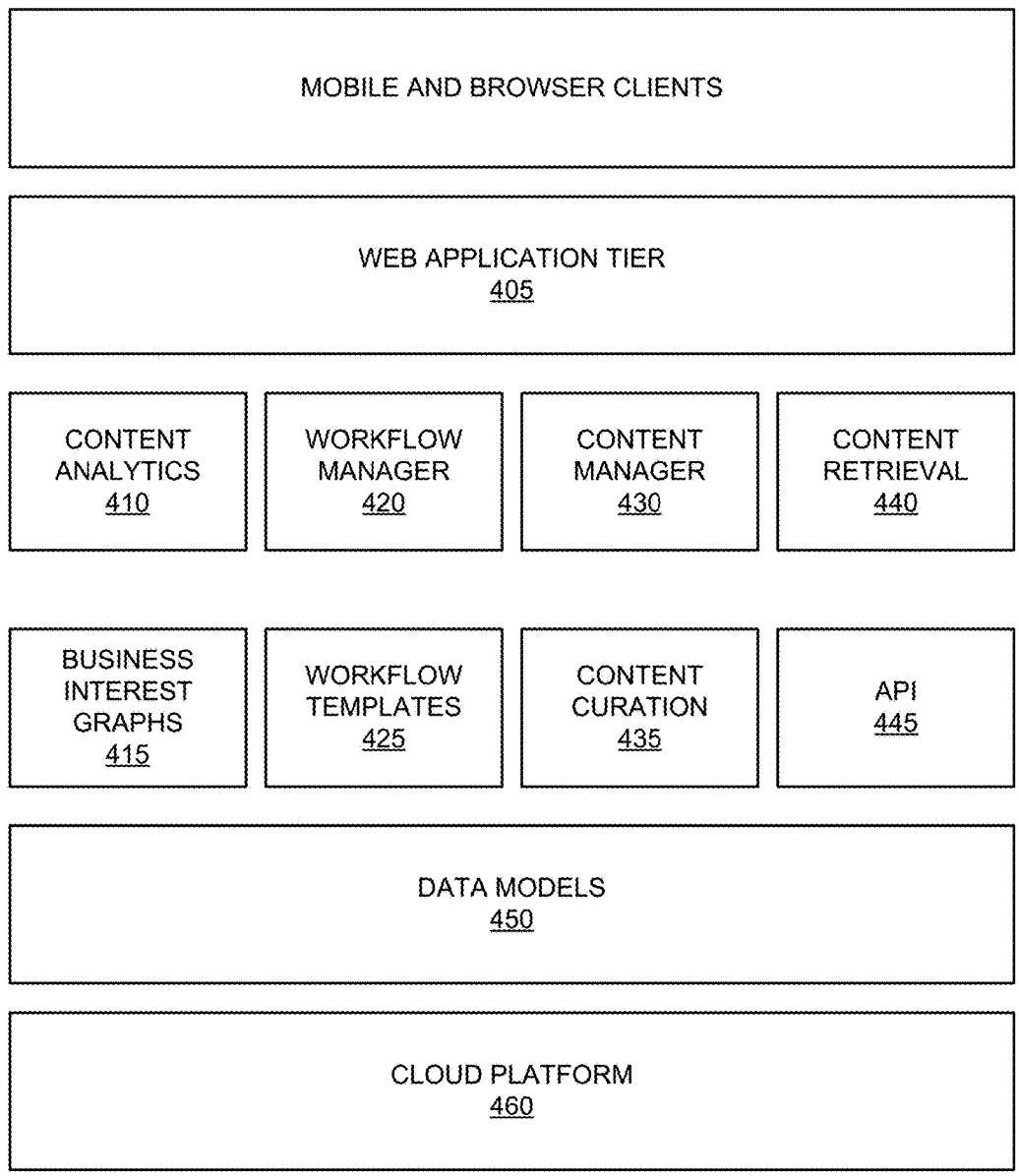
FIG. 4 is a block diagram of components of the information discovery and curation system according to one embodiment of the present invention.

FIG. 4 is a block diagram of components of information discovery and curation system 300 according to one embodiment of the present invention. In this example, web application tier component 405 services incoming user requests from mobile and browser clients. Web application tier component 405 as well can deliver RESTful API for other components to interact with the backend services, e.g., content retrieval component 440 and API 445.

Content analytics component 435 analyzes content to build business interest graph 415. Business interest graph 415 maintains relationships between users and content and is able to answer questions such as the group of users that have similar content interest, as well as groups of content that is accessed in response to a task or information request. Content analytics component 435 can incorporate various machine learning components such as collaboration filtering algorithms, support vector machine based classifier, clustering algorithms (canopy clustering and kMeans clustering), kNN nearest neighbor algorithm and singular value decomposition algorithm for eliminating noise in the data.

Workflow manager component 420 provides a comprehensive platform for adding, updating and managing workflow templates 425 for various tasks. Workflow manager 420 can utilizes a content language description, schema and data model for tasks, the searches for each task, business interest graph 415, and content curation rules.

Content manager component 430 provides for persistence, scaling and distribution of content such as user profiles, machine learning algorithm analysis results. Content manager component 430 can provide user profile management, so that each user's role, content access patterns and relevance determiners are managed. Content curation component 435 collect individual items of information, which is normalized into an attractive information package. Content curation component 435 can utilize a scheduler and job framework to launch various periodic tasks such as updating business interest graph 415 as well as content curation.

Content curation as used herein is the process of collecting relevant content from several sources and ranking that content for easy consumption. While traditional information retrieval systems would present results through a relevance ranked list, system 300 includes several additional measures to transform the content for easy consumption. For example, given a task or information workflow, content curation component 435 determines content within the results from various searches. Based on the results, content curation component 435 can determine layout and placement of results in a visually appealing form. In one embodiment, content curation component 435 builds easy navigation using a card paradigm, where each card contains a specific type of result. Content curation component 435 may also normalize fonts and typography so that the entire content is more easily readable, remove unnecessary content from pages that may not reflect the overall information need for the task or workflow, or automatically insert information for linking and launching other linked applications. As an example, if content curation component 435 finds content that is an email address or phone number, content curation component 435 can convert the content into clickable entities to launch a workflow step or function. Content curation component 435 can further generate thumbnail images to accompany critical information content or generate mouseover and hover hotspots so that can deliver associated information with greater interactivity and immediacy.

Other curation aspects provided by content curation component 435 can include:

a) Ability to provide feedback through monitoring of their user clicks, link traversal.
b) Ability to mark content components as Favorites.
c) UI facilities to share marked content with others in the organization. Also, the system can automatically send a copy of the cards to a user's devices.
d) Ability to summarize content into more concise packages.
e) A way to generate information packages for offline consumption.

Data models 450 represents main entities, such as People, Company, Departments, teams etc. Each entity can contain attributes determined to be essential for capture in a profile. Cloud platform 460 provides cloud administration and management, for deploying highest density of resources. Cloud platform 460 can include reporting and dashboard for measuring and monitoring usage of the platform as well as specific content sources.

B. Content Aggregation and Curation

In embodiments, the cloud service can discover information that is relevant to a meeting and its attendees from a variety of sources. The cloud service can utilize one or more aggregation services. Each aggregation service can be specific to a particular type of data sources, thus, providing the appropriate queries or interacting with the appropriate APIs.

Figure 5:
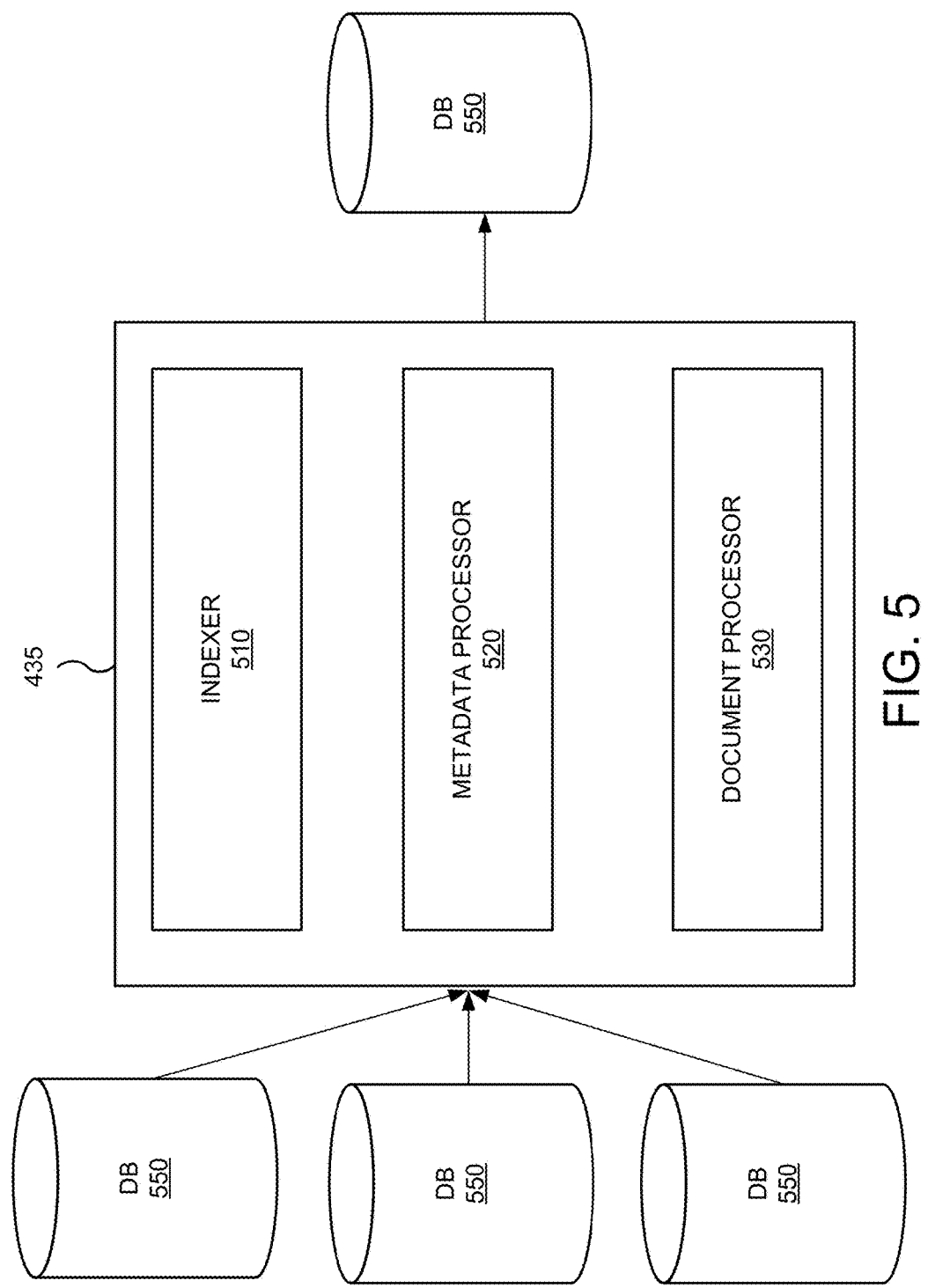
FIG. 5 is a block diagram of a content aggregation component that may be used with the information discovery and curation system in one embodiment according to the present invention.

FIG. 5 is a block diagram of content curation/aggregation component 435 that may be used with information discovery and curation system 300 in one embodiment according to the present invention. In this example, component 435 includes indexer 510, metadata processor 520, and document processor 530. Indexer 510 includes hardware and/or software components for indexing content retrieved from external data sources 540. In various embodiments, indexer 510 provides indexes configured for accessing and retrieving a variety of content, metadata, and attributes associated with information discovered from data sources 540 by processing system 500. Indexer 510 can maintain content indexes, full text indexes, topic indexes, cluster full text indexes, participant indexes, and other fact tables. These indexes may be embodied as one or more flat files, databases, data marts, data warehouses, and other repositories of data. The full text index may be an inverted index that enables fast searching of content, metadata, and documents associated with calendar data. Although the disclosure references specific examples, e.g., calendar data, the disclosure should not be considered as limited to such. The disclosure is applicable to other types of electronic information.

In one example, indexer 510 may store relationships between predetermined, user-defined, or automatically derived topics, concepts, or categories and content processed by component 435. In another aspect, indexer 510 may store relationships between related content. A relationship may be defined based on statistical analysis of noun phrases, linguistic analysis, semantic analysis, or the like. In yet another aspect, indexer 510 can index information related to meeting participants.

Indexer 510 can include hardware and/or software elements that index electronic documents. Indexer 510 may include functionality for decomposing documents into constituent parts. For example, indexer 510 may process an calendar data to parse header or body fields to retrieve content and generate metadata. Indexer 510 may further perform other types of processing, such as surface processing, statistical processing, linguistic processing, semantic processing, or the like.

Advantageously, indexer 510 can provide access to indexed electronically stored information to assist in identifying relevant opportunities for sales professionals. After "crawling" data sources 540 to retrieve content, metadata, documents, and the like, indexer 510 can process and index the retrieved information. Component 435 can then allow search and query of the processed information for a variety of purposes. Component 435 can further provide other post-processing features to augment the discovered information and enhance presentation of relevant information to a user.

In yet another example, metadata processor 520 can include hardware and/or software elements that process metadata associated with the content retrieved from data sources 540. In various embodiments, metadata processor 520 can retrieve "organizational" or "corporate" data associated with attendees of meetings, such as department identifiers associated with a user or computer host, a group identifier associated with a user, a corporate or departmental title associated with a user, telephone and address information, and security information. Metadata processor 520 may retrieve social network profiles for attendees, news feeds that reference a participant or related organization, blog content authored by the participant or related organization, or the like. Metadata processor 520 can index the information or provide the information to indexer 510.

In another example, document processor 530 can include hardware and/or software elements that process documents associated with the content retrieved from data sources 540. In various embodiments, document processor 530 decomposes a document into predetermined portions for indexing by indexer 510. Document processor 530 may, for example, extract documents attached to emails sent by a meeting participant, process file repositories, interact with document management systems, interact with enterprise applications, or the like. Document processor 530 can index the information or provide the information to indexer 510.

C. Analytics

In embodiments, the cloud service can determine the appropriate algorithm for the discovered information in order to create connections, rank opportunities, prioritize interactions, and the like. The cloud service can utilize a dynamic real-time engine that processes each user's content and then builds business intelligence for that user. This intelligence can be embodied in a business interest graph that captures the person's information access profile, which is a combination of their business interactions with other individuals, the information content they shared with them, the context in which they exchanged this information as well as their prior history of similar information consumption model.

In one embodiment, the three primary models are used for content analytics. The first is tasks and activities. Tasks provide the context for driving the information goals. As an example, the task of preparing for a customer review meeting would trigger a sequence of collection of certain information useful for that task. The second is people and connections. Different people can be involved in a business interaction, whether they are internal and external participants in a meeting, individual responsible for review and approval of content, etc. Third is content. Content can be identified from various sources, selected through a sequence of searches against several repositories deemed relevant for execution of a given task or activity.

Figure 6:
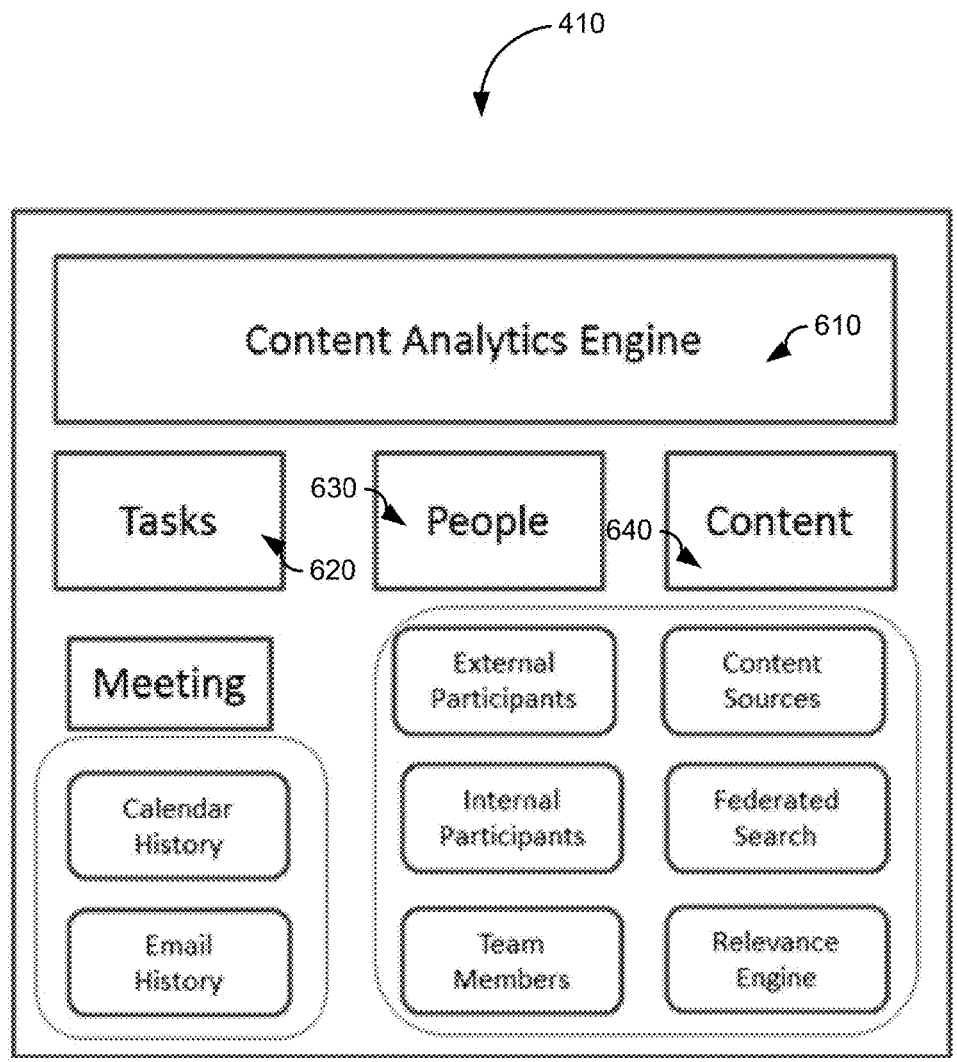
FIG. 6 is a block diagram of a content analytics component that may be used with the information discovery and curation system in one embodiment according to the present invention.

FIG. 6 is a block diagram of content analytics component 410 that may be used with information discovery and curation system 300 in one embodiment according to the present invention. Component 410 utilizes content analytics engine 610 to process the three main entities, e.g., tasks 620, people 630, and content 640 using advanced analytics. Content analytics engine 610 understands the profile of individuals from several sources and builds their business interests. Content analytics engine 610 can also provide disambiguation of people whose identities may not always be available in the context of a task.

Given partial information about an individual (such as their email address), content analytics engine 610 works to identify the exact individual involved in a task. In many cases, communication and information exchange patterns involve such partial communication, and a dynamic disambiguation system is needed for identifying the individuals. As an example, the context of a meeting invite may include internal and external participants. Content analytics engine 610 further determines the role of individuals in the context of the task. This can be determined using a variety of public sources such as LinkedIn, Twitter posts, their contact information in Jigsaw etc. Content analytics engine 610 may also collect historical information about participants in tasks.

In various embodiments, content analytics engine 610 can process a user's recent emails, and their interactions, to identify additional participant information. Content analytics engine 610 may perform an additional analysis identifying other individuals who may have knowledge of critical pieces of information related to the task.

In one embodiment, content analytics engine 610 employs machine-learning to build a people similarity index. The people similarity index considers each individual and the content they accessed in the context of a task. Similarity of the content they accessed is also identified, using content similarity measures such as document meta-data and internal content, processed into a document vector notation. A follow-on grouping of individuals who access or consume similar content is determined so that given a certain description of content through exemplars, other individuals who consume the same content can be automatically identified. With this knowledge, content analytics engine 610 can suggest individuals who may have knowledge of a particular task and establish a dialog for connections from the user seeking information related to a task.

In one embodiment, content analytics engine 610 determines other individuals involved in the same task. As an example, if there are ten participants in the meeting, content analytics engine 610 collects information for each one, knowing their role. Content analytics engine 610 then allows sharing of content, from one user to every other user, with content specifically tailored for each user. For each user, content analytics engine 610 can identify their role and the content sources they have access to. From the content shared by another user, content analytics engine 610 can determine the critical criteria for relevance. This could be specific search terms or filtering constraints. Content analytics engine 610 can use the criteria against their individual content. Content analytics engine 610 can use any content that the original user shared for the task. This could be material owned by the original user that they would like to highlight and share specifically for that task. Content analytics engine 610 can prepare an information package that reflects the content for the current user. An example of this scenario is a sales meeting where both sales executive and their support and field engineer are present. There is common content that all individuals can share, but this is supplemented by information tailored for each attendee. This is driven through people analytics.

In some embodiments, content analytics engine 610 can establish a feedback loop and analyze feedback in order to constantly refine the business interest graph and the content access patterns for completing users task workflows. As an example, if content analytics engine 610 determines that CRM data from Salesforce is consumed less than defect tracking report in the context of customer escalation meetings, content analytics engine 610 can use that knowledge for better alignment of both content in future meetings for that individual. End user applications can offers facilities to provide direct feedback, e.g., using a Favorites option. A simple option to quickly tag content that is curated has a significant weight for similar content curation in future information packages.

In one embodiment, content analytics engine 610 tracks feedback at several levels with varying degrees of importance. From personal usage of curated content, content analytics engine 610 can determine the importance of content for that context. Content analytics engine 610 can apply this ranking measure in future contexts that match the same content access pattern. Content analytics engine 610 can perform content matching utilizing its content interest graph to determine this, so that feedback can be applied more broadly. As another example, content analytics engine 610 can predict from the user's categorization of content other content that could also be important for a given context. Thus, content analytics engine 610 takes into consideration each individual's usage of curated content.

When curated content is shared with others, that selection is tracked by content analytics engine 610 for both the individual sharing the content and the others he/she is sharing it with. An additional application of feedback analysis is the concept of extending one individual's feedback to others. Content analytics engine 610 can track multiple individual's access and usage patterns and determines common access patterns. Also, both person and content interest graphs supplement this commonality so that unrelated and useless patterns are discarded. As an example, if individuals who collaborate on a certain topic provide feedback that a certain group of content is commonly utilized, content analytics engine 610 determines a generalized feedback learning that can be applied later. In some embodiments, content analytics engine 610 prepares feedback analysis addressing privacy concerns by utilizing appropriate content firewalls as well as anonymization of the individuals from whom it obtained feedback.

In various embodiments, content analytics engine 610 can include a relevance engine. The relevance engine ranks and filters results from a search engine based on the goals of the task. One component of the relevance engine can be a collection business interest graphs that track people, content, and tasks to evaluate relevance of all identified content.

Figure 7:
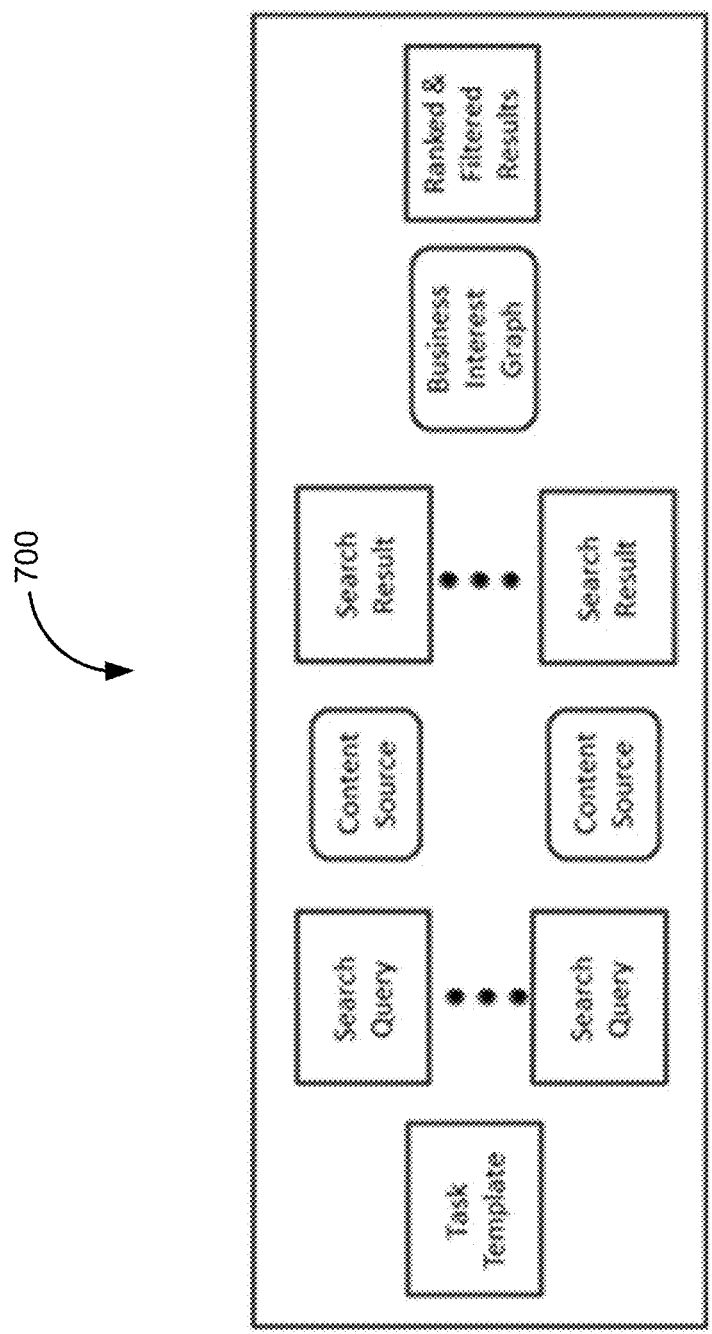
FIG. 7 is a block diagram of a flow for a relevance engine that may be used with the information discovery and curation system in one embodiment according to the present invention.

FIG. 7 is a block diagram of a flow for relevance engine 700 that may be used with the information discovery and curation system in one embodiment according to the present invention. As an example, a task may involve a search for trouble tickets in preparation for a customer care review meeting. The repositories that are most relevant for that task can be identifier and relevance engine 700 can rank that content higher. Relevance engine 700 can evaluate the customer that is the focus of the task, when the account was last updated, who updated the account, and whether the CRM's view of account status reflects the current activity on account. Relevance engine 700 also understands the individuals involved in the meeting, their most recent emails, as well as any specific actions by those participants for the customer. If an event was escalated, and the escalation causes an email trend, those are deemed more important. After analyzing the information, relevance engine 700 can rank results that are more current, from more authoritative individuals, and more reliable sources higher than other sources.

In one embodiment, relevance engine 700 applies appropriate filtering and ranking to remove irrelevant details (ensuring high precision). As a general rule, the factors that impact relevance are:
1. The Person and their connections in their Business Interest Graph.
2. Content meta-data such as the location and timelines of the content.
3. Roles and context of tasks that individuals engage in.

In further embodiments, relevance engine 700 utilizes interest graphs that reflect the content access and consumption patterns of individuals. System 300 can build multiple interest graphs, each reflecting a certain conceptual connection between entities. In one example, relevance engine 700 can utilizes a person interest graph. A person interest graphs can connect individuals based on a connection attribute. For example, a person interest graph can be built for individuals interested in a certain technology (such as data center technology). Using an individual's initial role, a determination can be made that the person is in fact interested in data center technologies. This can be performed through their profile in LinkedIn, their title, functional role in their team, etc. Using external databases such as their Twitter Follows, LinkedIn groups, etc., other persons who are connected to the individual can be determined. Some of these can be filtered out based on the determined interest of the individuals. As an example, a Twitter follower may follow the individual on the basis of non-Data Center based interest, so they would be filtered out. For individuals within an enterprise, the meetings an individual participates in routinely can be determined, the other participants in those meetings, the email exchanges with these participants, and whether those individuals are also data center technology implementers, operations staffs, support staffs, etc.

A graph can be built based on the discovery of content-specific roles, where each node is a person and each connection signifies how strongly the individuals are connected. Connection strength can be based on an analysis of how much information (such as emails and documents) they exchange, the meetings they participate in, as well as tasks they collaborate on. Additionally, a content-agnostic graph can be built of every individual and every connection to determine graph partitions that emerge based on interactions. As an example, it can be determined that the individual is interested in both data center expertise and people management roles by determining based on graph analysis that there are two graph partitions, one with data center connectivity and another with human resource groups.

Person interest graphs with many different interest profiles can form the basis of determining the scope of content that would be relevant in a given business context. For discovering and delivering content from shared repositories, a person-to-person interest graph can guide which subset of the shared content is most useful for a task that individuals in the graph engage in. This knowledge can also be used for curation of content.

As a counterpart to the person interest graph, a content interest graph can be built, which reflects how strongly a certain set of business content is connected to other content. Content can be analyzed for the individuals that access the content, the frequency of access, and their role. The meta-data of the content can also be analyzed to determine how recent the content updated and the properties of files/containers of the content. Textual content can further be analyzed through a deep content inspection, resulting in extraction of entities, tokens, statistically determined co-occurrence patterns, etc. Content may be grouped based on content clustering, which identifies similar content.

Accordingly, connections from one content item to another content item can reflect the individual's interest level for both content items, the closeness of the two items, the recency of access of the two items and their meta-data attributes, and the like. Content consumption patterns can also be tracked and analyzed using the feedback collected from content delivery. As an example, if a user accesses a document right after accessing another document delivered in a curated package, that knowledge can be used to create or update a connection in the content graph.

Content interest graphs help in relevance by leveraging the attributes that defines connections between items. After performing a broad federated search across repositories that an individual has access to, the content interest graph can be used to identify closest other documents that match the interest patterns. For example, in the context of a customer escalation meeting, the spreadsheet of customer trouble tickets can be determined to be strongly connected to a report from product manufacturing that tracks product defects. The two can be presented as highly ranked documents. In another example, content can be curated for offline consumption where several documents can be summarized into a concise package based on content interest graph relevance.

D. Workflows

In embodiments, the cloud service can implement workflows and analytics to gather, curate, and deliver relevant information to users. In various embodiments, system 300 implements the notion of information workflow, realized through workflow manager 420. As used herein, a workflow is a sequence of information steps that one would take to complete a task. Each step in this sequence specifies a type of information request, the results from the request and finally a curation description. Workflow manager 420 can manage workflow steps using workflow templates, where each template describes a specific type of task or trigger. As an example, a trigger such as sales meeting can be described using a Sales Meeting Template. Workflow manager 420 may process templates are based on an analysis of the task type (such as preparing for a previously scheduled meeting in a person's calendar). Workflow manager 420 can determine the workflow template to use. Template identification may be implemented through a complex sequence of machine learning, content pattern access analysis and any prior history with tasks of that type that either one user or another user in similar role or capacity had engaged in.

Workflow manager 420 can then analyze all the steps specified in the determined template, which is a combination of search queries, result specifications, and curation specifications. Workflow manager 420 can determine additional contextual information needed for the template. As an example, a sales meeting template may include several queries that relates to an opportunity, whose name needs to be determined or extracted by analysis of the meeting notes, agenda for the meeting or other emails from participants of the meeting. Such information may need to be pulled out of repositories, such as Salesforce.

Given a context, workflow manager 420 can perform several parallel searches and federate the results by applying ranking and filtering algorithms. These can be governed by relevance criteria from business interest graphs 415. Content curation specifications in the template define how the results need to be processed and curated for consumption. Part of a workflow can also be to define how the curated content can be shared, and how the feedback items in content are established.

E. Packaging/Delivery System

The cloud system can incorporate multiple models of delivery of curated content to individual users. The cloud system can rely on modern data networks and the ability to monitor individual user location, their tasks, and the devices they use to consume data. In one example, curated content can be delivered on specially prepared dynamic web page, which can be accessed by individuals using a modern browser. Content can be made available specifically for mobile devices using device-specific native applications, designed for that device. Curated content can utilize simple navigation paradigms, layout and tap and touch sensitive UI, and other features that make for a pleasing and highly interactive end user application appropriate for the device. In order to facilitate offline content consumption, the content cam be packaged in independent and self-contained containers, such as PDF files.

Another aspect of information delivery is its quick and easy content sharing mechanism. A private view and a shared view can be simultaneously provided based on a workflow template for a task and sharing indicators. Each alternate view of the content can be prepared for delivery to other individuals who share that task or event.

F. Example Information Discovery and Curation Flows

Figure 8:
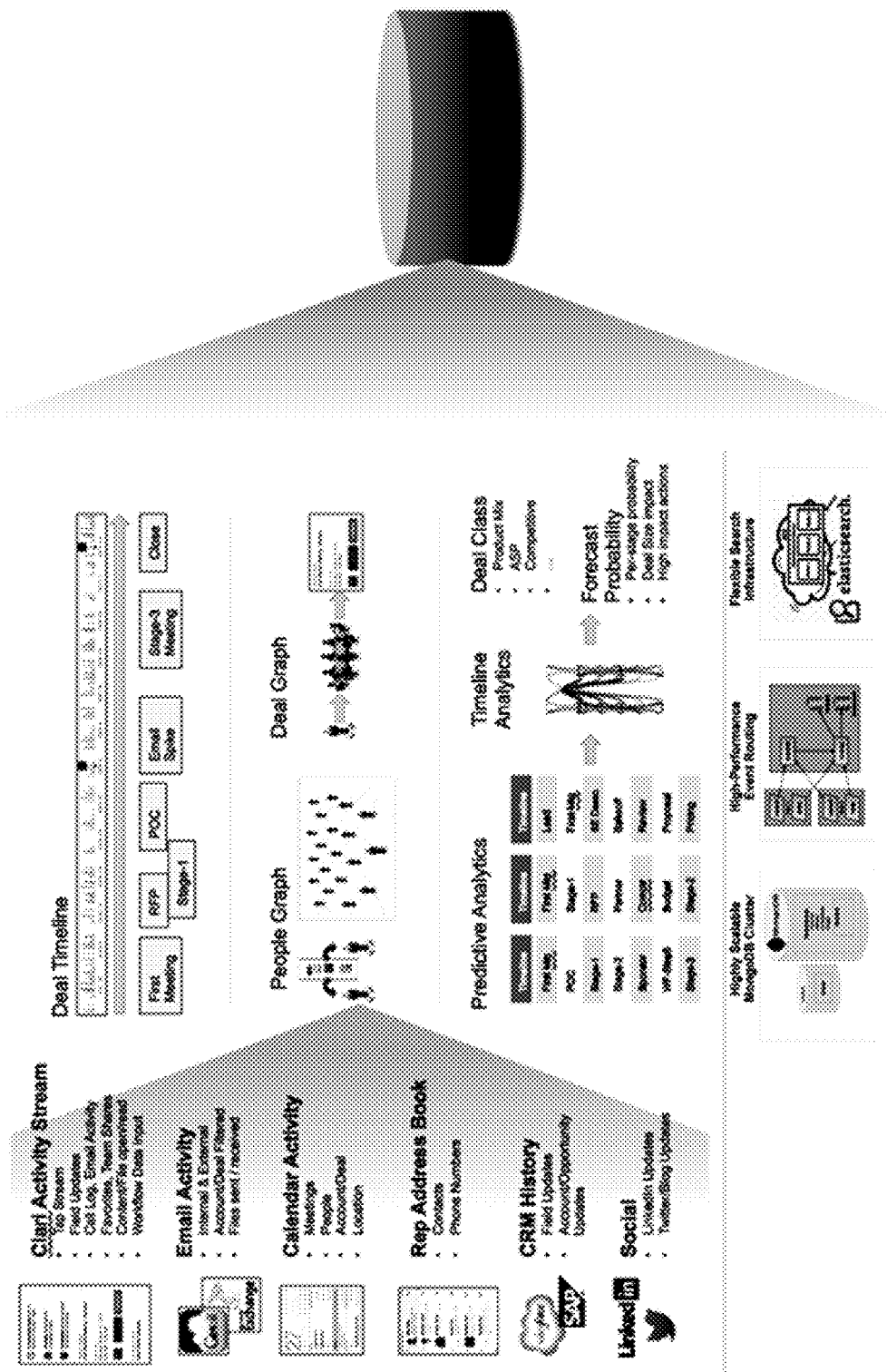
FIG. 8 is an illustration of an example overall flow of information into the information discovery and curation system according to one embodiment of the present invention.

FIG. 8 is an illustration of an example overall flow of information into information discovery and curation system 300 according to one embodiment of the present invention.

Figure 9:
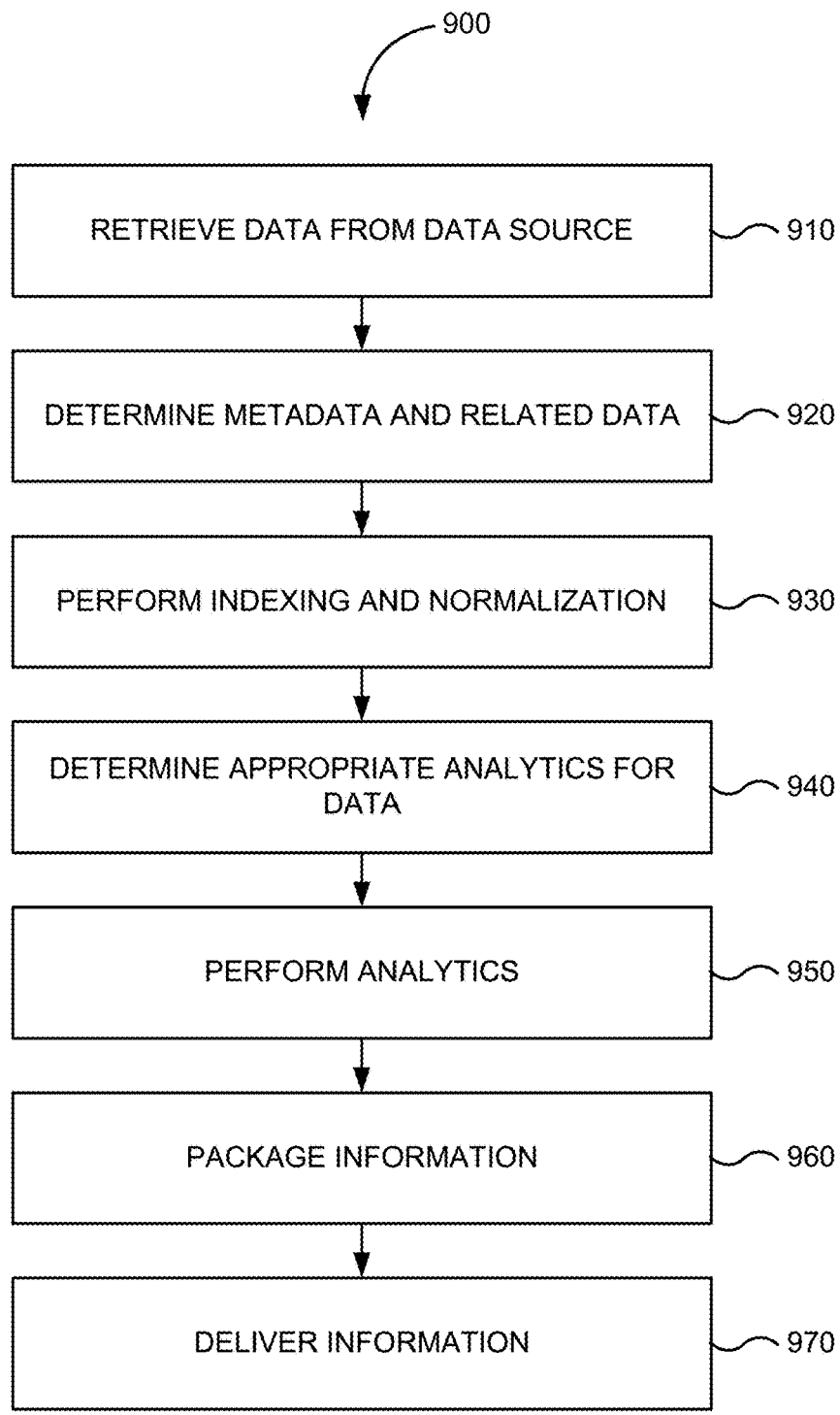
FIG. 9 is a flowchart of a method for information discovery and curation according to one embodiment of the present invention.

FIG. 9 is a flowchart of method 900 for information discovery and curation according to one embodiment of the present invention. Implementations of or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 910, data is retrieved from a data source. Some examples of data can include data from email activity, data from calendar activity, data from contacts and address books, data from enterprise applications such as CRM, data from social or professional networks, user-generated or derived data, or the like. The data can be pushed for processing or periodically retrieved from the repository. The cloud service can implemented one or more connectors, APIs, agents, or the like for connecting enterprise applications or repositories for data retrieval.

In step 920, metadata and related data is determined. Metadata can include metadata retrieved from the data source, data models, data attributes, data properties, or the like. Related data can be determined based on the data source, data type, data context, data context, or the like.

In step 930, indexing and normalization is performed. As discussed above, one or more indices can be generated that map the data to keywords, topics, people or other entities, etc. Normalization as used herein can include layout, formatting, modification, summarization, etc.

In step 940, the appropriate analytics for the data is determined. Different types of data may require different types of analytics. One or more analytical algorithms can be determined based on the data source, data type, data attributes, data format, etc.

In step 950, the analytics are performed on the data. As discussed above, the analytics can be used to create or update business interest graphs, perform predictions, perform recommendations, rank and score data, etc.

In step 960, information is packaged for delivery to a mobile device. The retrieved data, related or relevant content, metadata, results of analytics, etc. can be packaged in a format appropriate for the mobile device. In some embodiment, the data can be augmented, sanitized, summarized, modified, etc. as needed based on a business context. An information package may include additional references, links, lists, annotations, etc. that take advantage of features provided by the mobile device. In step 970, the information is delivered to the mobile device.

Accordingly, the cloud service offers a comprehensive set of features for finding, consuming and sharing information by individuals within an organization. By building a deep knowledge of individuals, their content access patterns and their task workflows, the cloud service identifies the most relevant content and proactively delivers it to individuals when they need it most. The cloud service can use concepts such as machine learning and dynamic interest graphs in order to refine results and produce results that reflect a task to be performed in a business context. The cloud service automates the discovery and information workflow steps, thereby offering significant value to its users.

III. Analyzing Custom Data

A. Example Custom Data Analysis Flow

In certain embodiments, the cloud service can perform analytics on custom data. This allows the appropriate analytics for the data to be dynamically determined as different types of data may require different types of analytics and workflows.

Figure 10:
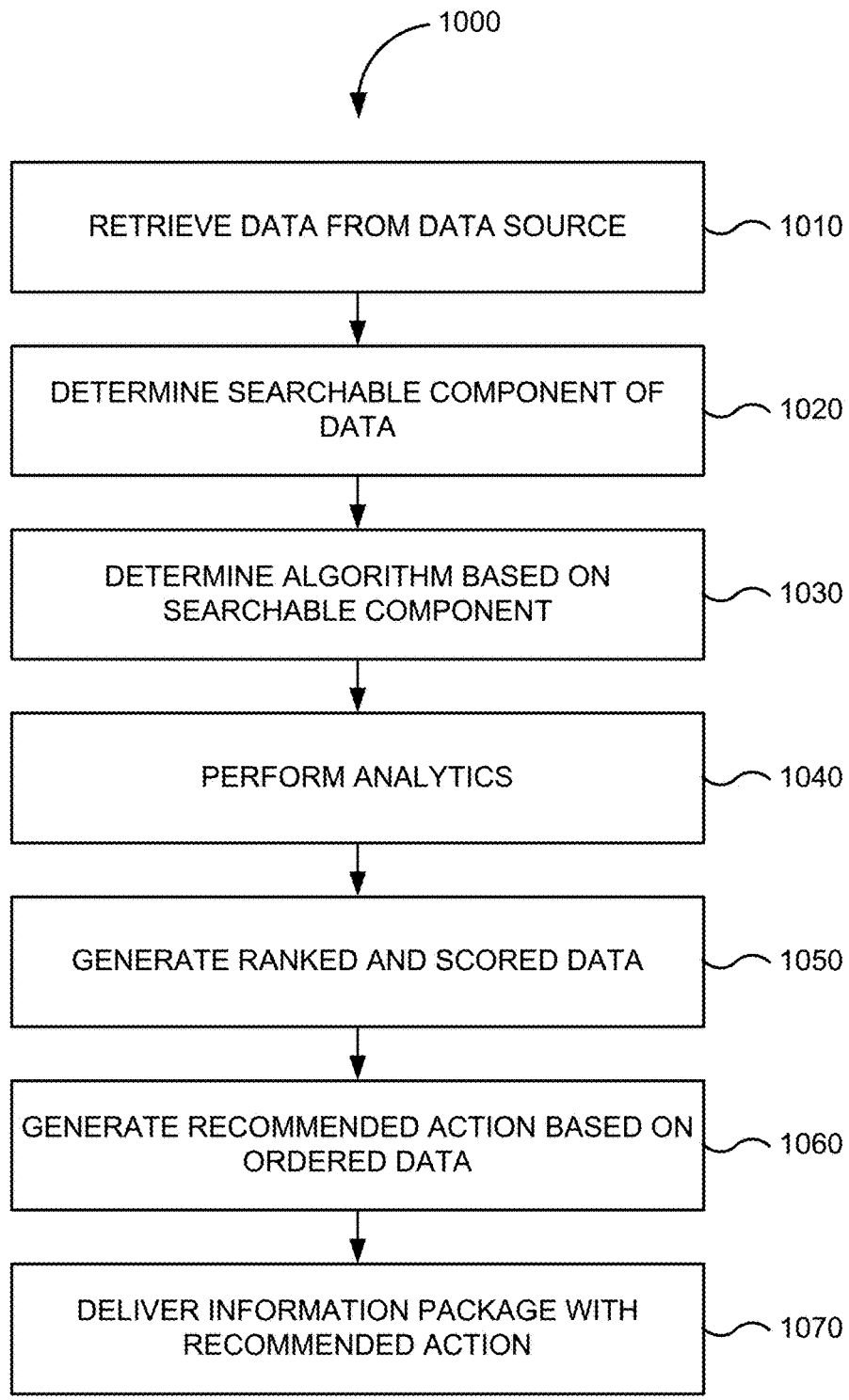
FIG. 10 is a flowchart of a method for custom data analysis within the information discovery and curation system according to one embodiment of the present invention.

FIG. 10 is a flowchart of method 1000 for custom data analysis according to one embodiment of the present invention. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 1010, data is retrieved from a data source. In step 1020, a searchable component of the data is determined. Often, data can be decomposed into one or more searchable components. A searchable component as used herein refers to an element of a data record that is to be indexed. Some examples of searchable components can include people: tasks, and content such as participants of a meeting, recipients of an email, meeting information, authors of a document, document properties, etc.

In step 1030, an analytics algorithm is determined based on the searchable component, etc. People, tasks, and content may require different types of analysis, indexing, normalization, etc. For example, an analytical algorithm that ranks recipients of an email can be determined based on certain portions within header information of an email. The algorithm may be different from one that ranks attendees of a meeting because content and the business context may be different. In another example, an analytical algorithm that evaluates a task can be determined based on the types of task, when the task is to occur, a business context associated with the task, etc. In step 1040, the determined analytics are performed.

In step 1050, ranked and scored data is generated. In certain embodiments, the data can be ranked and scored based on the rank, priority, or importance derived from searchable components associated with the data. In step 1060, one or more recommended actions can be generated based on the data. For example, a recommendation to review a certain piece of content can be provided based on the importance placed on the author of the content with respect to a user or the relevance of the content to a business context, such as an upcoming meeting. In step 1070, the information is packaged and delivered to a mobile device with the recommended action.

Figure 11:
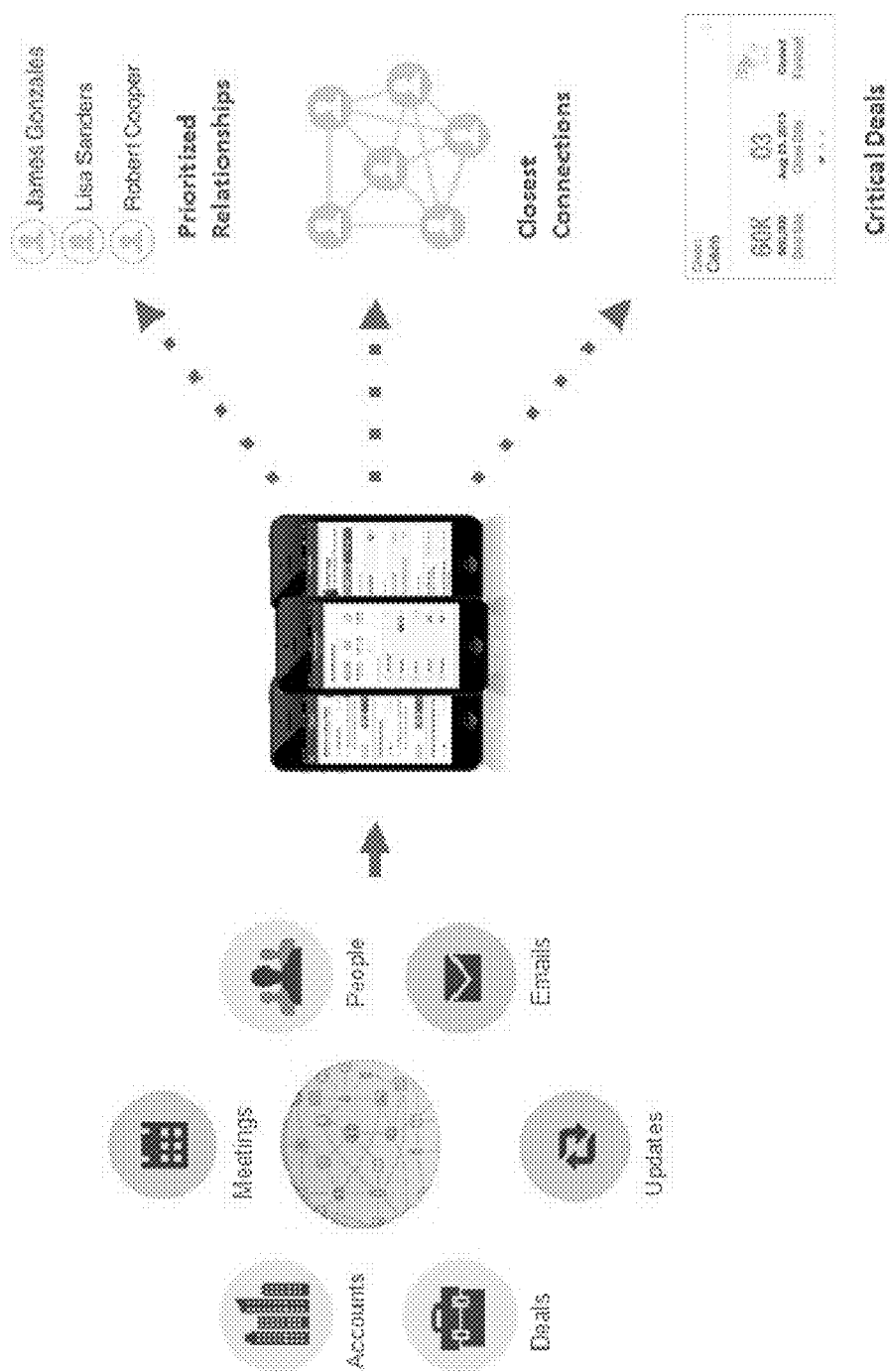
FIG. 11 is an illustration of an example overall flow of information out the information discovery and curation system from the custom data analysis according to one embodiment of the present invention.

FIG. 11 is an illustration of an example flow of information out of information discovery and curation system 300 using custom data analytics according to one embodiment of the present invention.

B. Calendar Analytics

In various embodiments, the cloud service can perform analytics on searchable components of calendar data, such as meetings and/or attendees of the meetings. FIG. 12A is an illustration of calendar data analysis according to one embodiment of the present invention. The cloud system can deliver appropriate and highly relevant content in preparation for the meeting. In some aspects, the cloud system can determine the importance of the meeting itself, agenda items to be discussed, the attendees, etc. Based on business interest graphs developed from the calendar data, the cloud system can more efficiently provide recommended actions than traditional solutions reliant on manual judgment or that provide information overload.

Figure 12B:
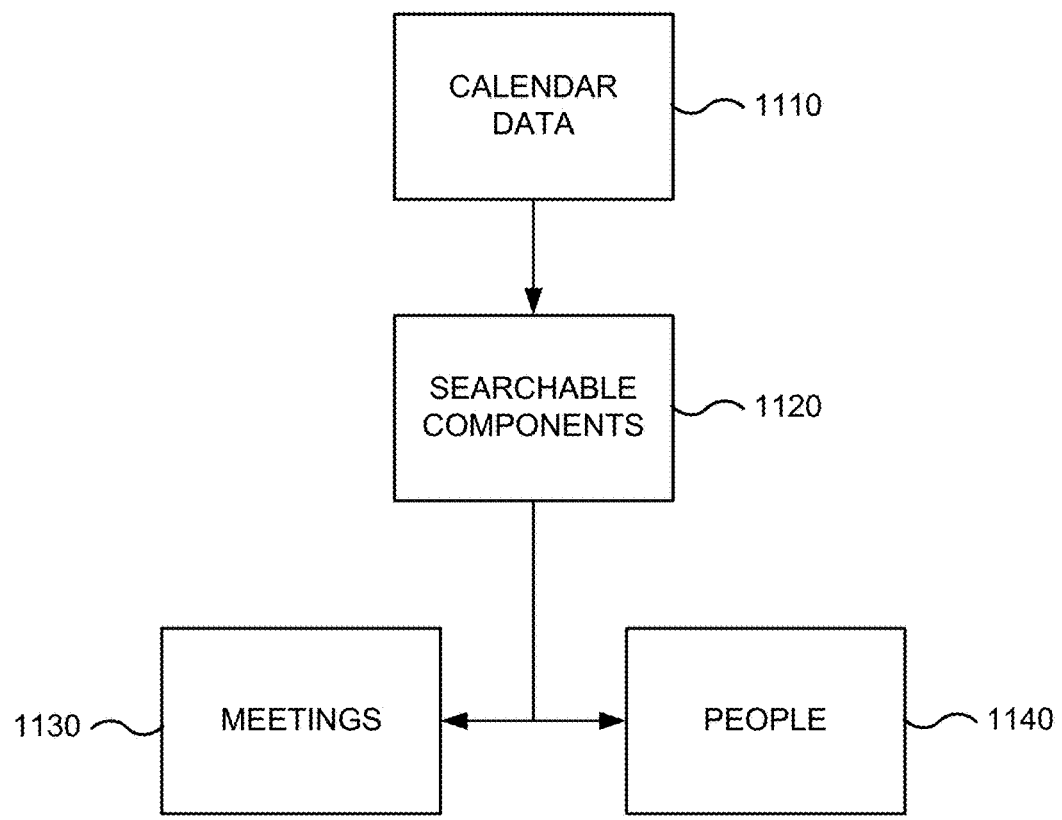
FIG. 12B is a block diagram of searchable components of calendar data in one embodiment according to the present invention.

FIG. 12B is a block diagram of searchable components of calendar data in one embodiment according to the present invention. In various embodiments, a calendar index is created based on crawling data sources having calendar data to determine searchable components. In one aspect, the data is analyzed and a new prioritized dataset is generated as a set of results. The cloud service may persist both intermediate and final results with appropriate indexes for fast retrievals. The cloud service may also cross reference or index data from other sources, such as email data and the like.

Table 1 provides an example list of searchable components that may be indexed based on calendar data.

TABLE 1

| Item | Description |
| --- | --- |
| meeting | meetings are all the meetings of the current user, with meeting score of importance of the meeting. |
| person | all people along with scores, with higher scores reflecting a higher importance. |
| internal_domain | what the internal domain for the user is based on analysis of the data |
| external_domain | what the external domains are, based on analysis (usually, for Sales Reps, external domains are the email domains of their accounts/opportunities). |
| partner_domain | partner domains are external domains that are associated with multiple accounts/opportunities, that are external to the user. |
| meeting_domain | for each meeting a user attends, the primary external domain of the meeting, by analyzing the meeting participants. |
| domain_meetings | for each external domain, the meetings that occurred for that domain, with each meeting scored for its importance. |
| attendee_meetings | for each attendee, the meetings they attended along with score of the participant in the meeting. |

Figure 13:
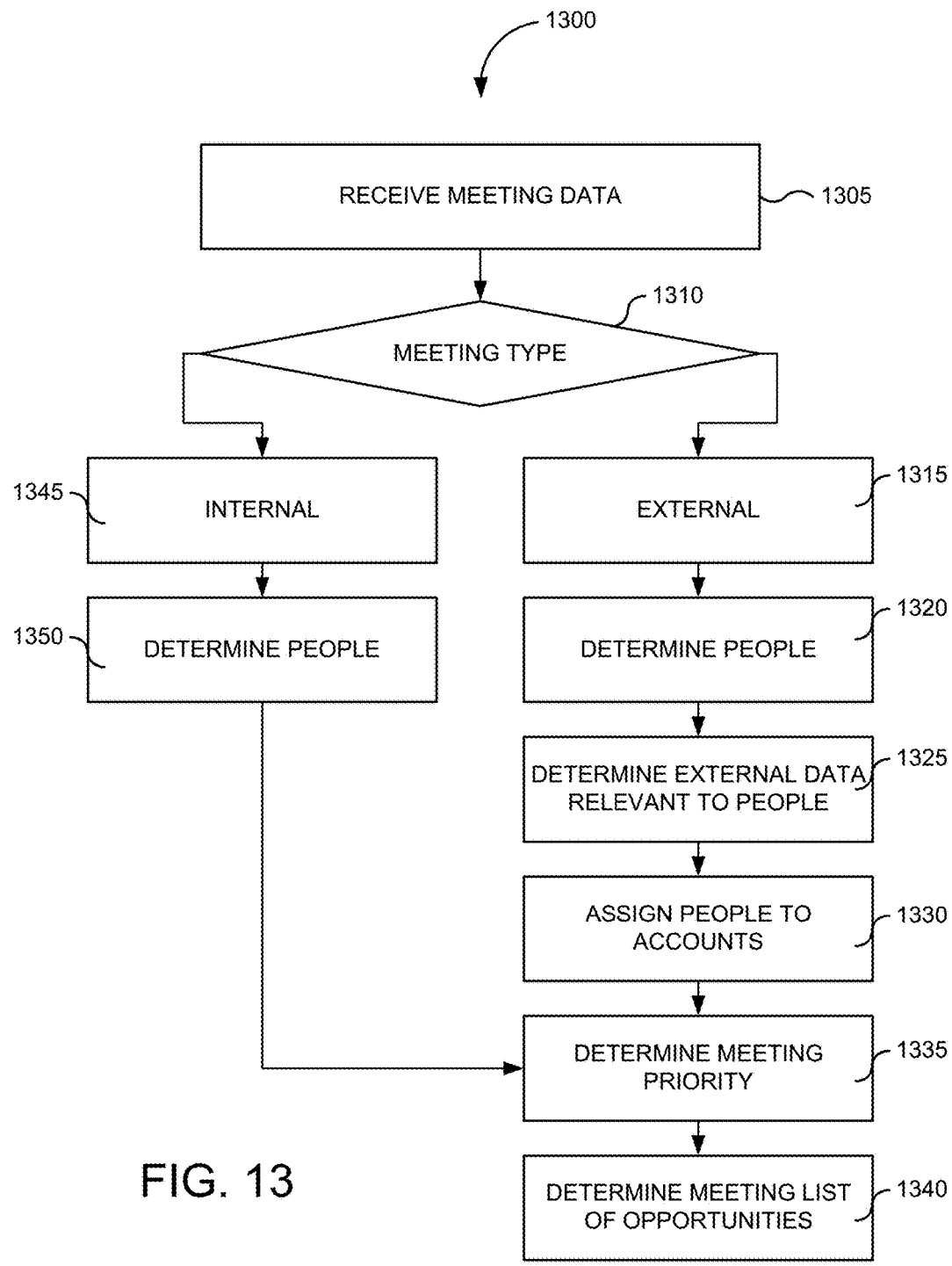
FIG. 13 is a flowchart of a method for processing calendar data in one embodiment according to the present invention.

FIG. 13 is a flowchart of method 1300 for processing calendar data in one embodiment according to the present invention. Implementations of or processing in method 1300 depicted in FIG. 13 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

Figure 14:
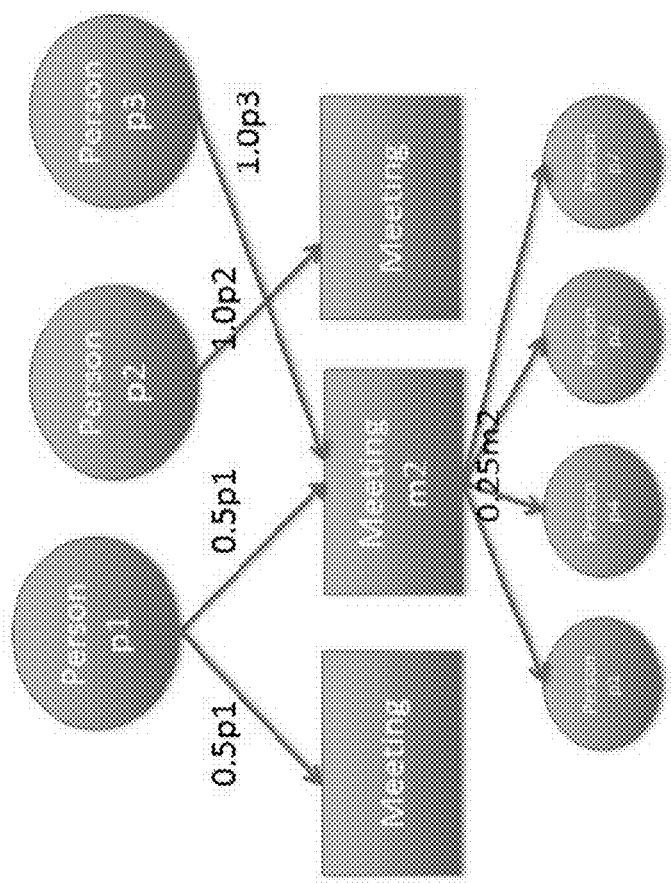
FIG. 14 is an illustration of calendar analytics in one embodiment according to the present invention.
Figure 15A:
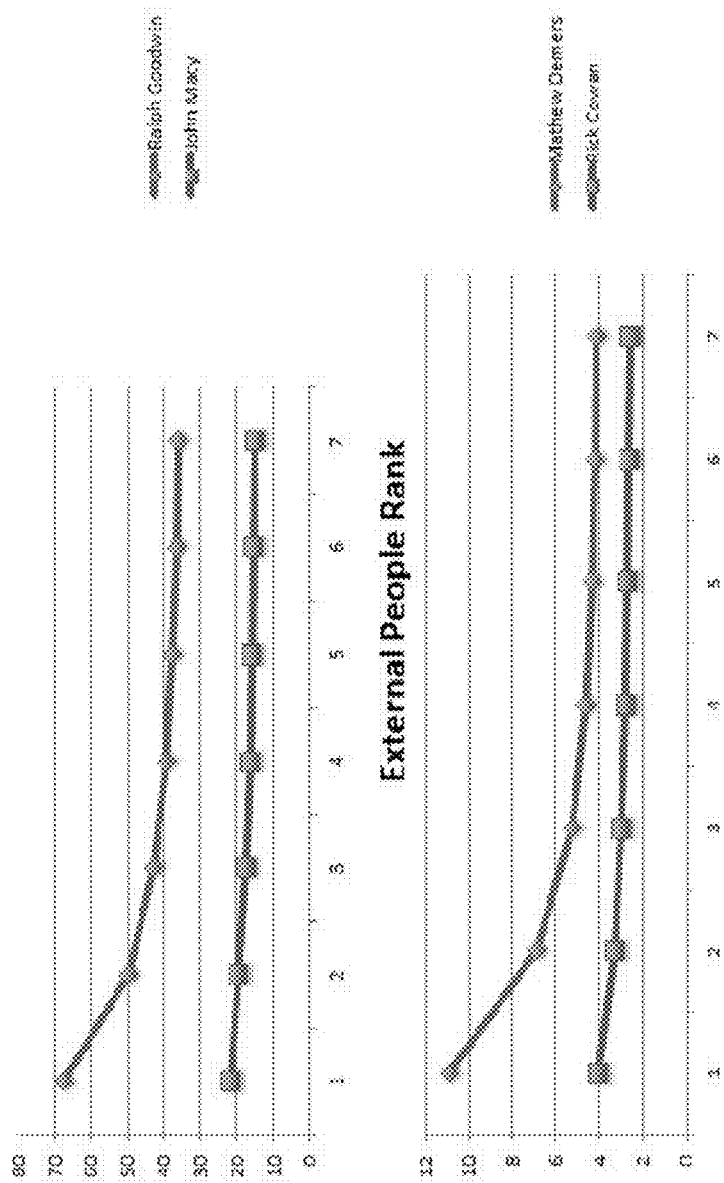
FIGS. 15A-15D are graphs illustrating convergence for ranking people and meetings in various embodiments according to the present invention.
Figure 15B:
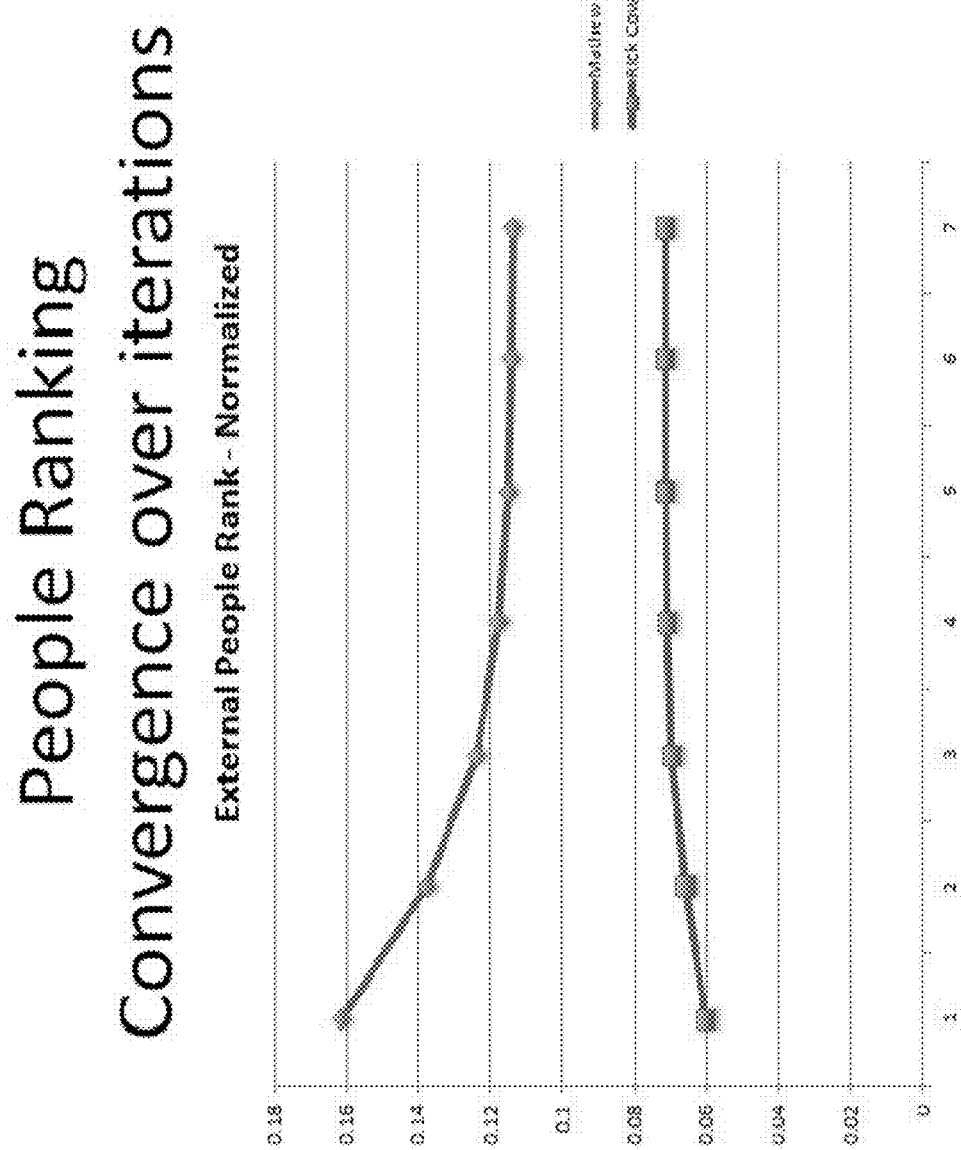
Figure 15C:
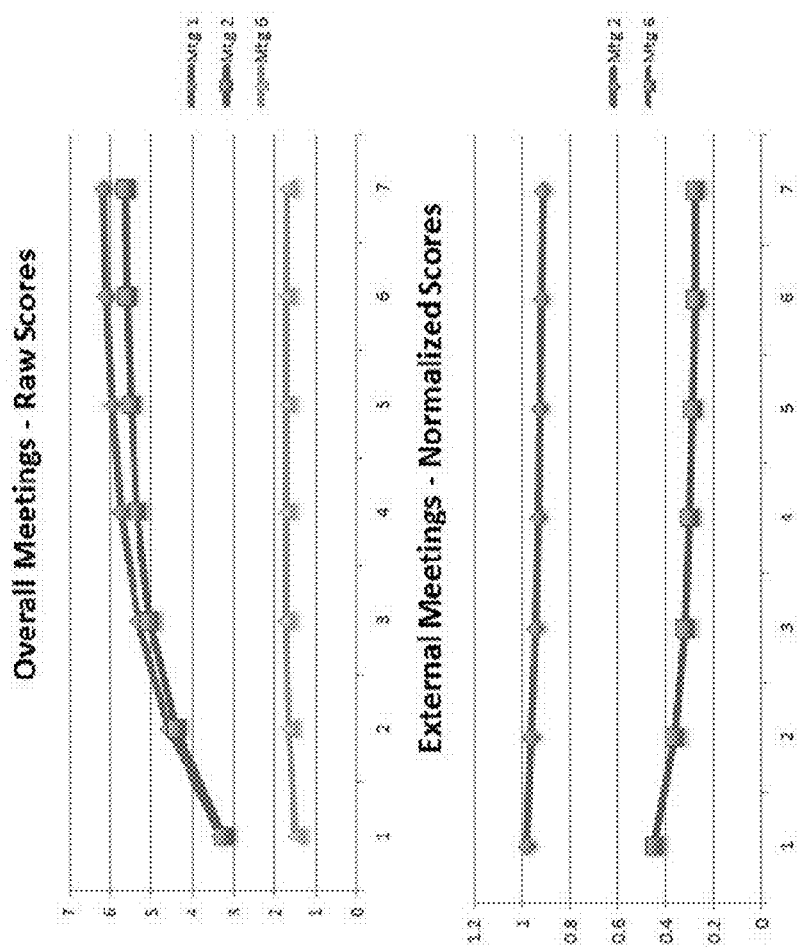
Figure 15D:
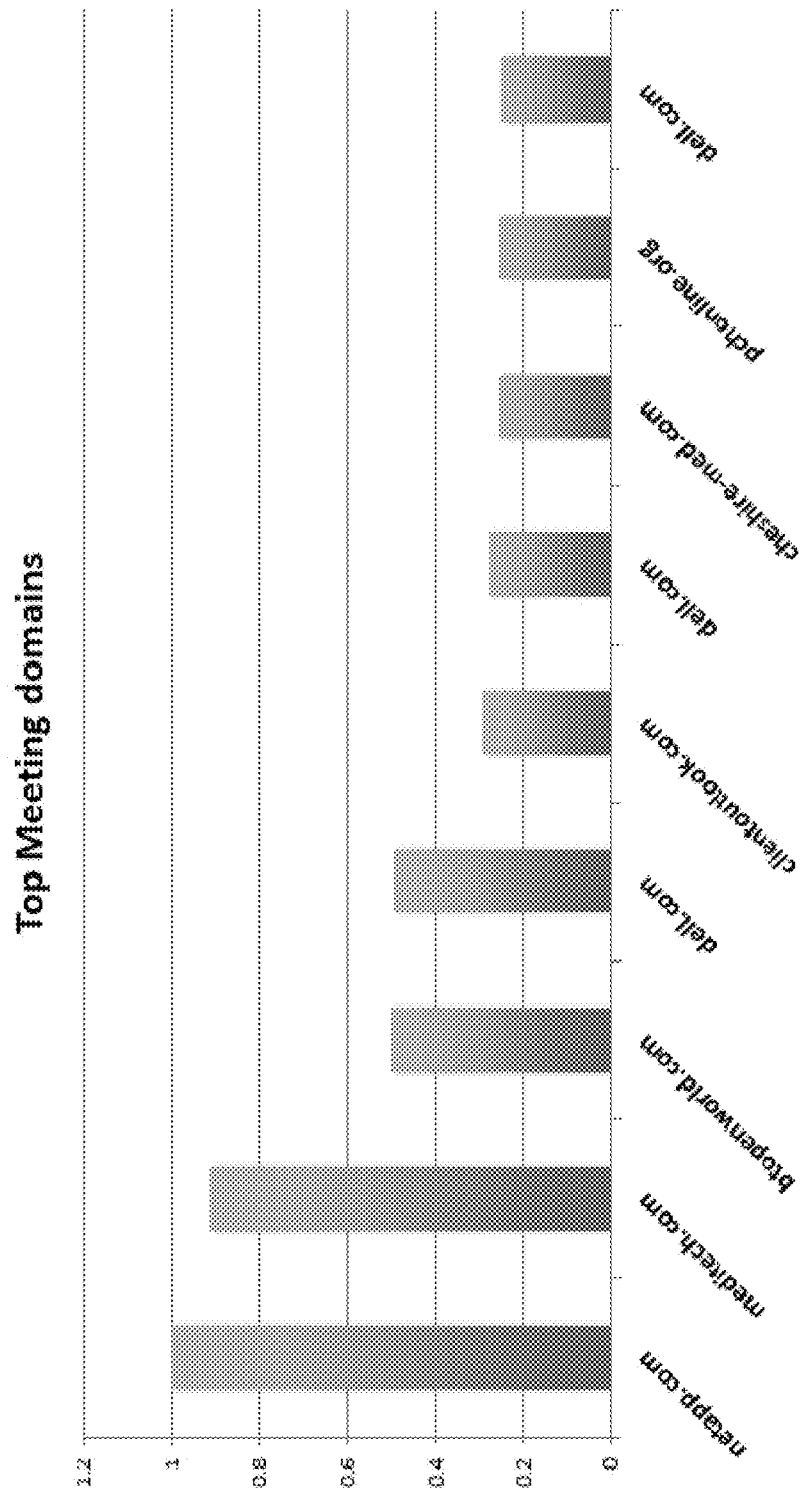

In step 1305, meeting data is retrieved from a data source. Meeting data can be retrieved from calendaring applications, scheduling repositories, unified messaging resources, etc. FIG. 14 is an illustration of calendar analytics in one embodiment according to the present invention. In embodiments, calendar analytics can involve some principles of circularity. For example, the Google PageRank algorithm determines the importance of a page is based on the importance of pages linking to it. A LinkedIn endorsement may have a value for a skill based on the endorsement value of the persons endorsing another.

In step 1310, a determination is made as to the type of meeting. Some examples of types of meetings can include whether the meeting is an internal meeting or an external meeting. An internal meeting as used herein refers to a meeting in which all attendees are part of the same organization or entity as the calendar owner. An external meeting as used herein refers to a meeting in which one or more participants are not part of the same organization or entity as the calendar owner.

In step 1315, a determination is made that the meeting data refers to an external meeting. In step 1320, one or more people are determined based on the meeting data. A determined set of people can include the meeting scheduler and the attendees, as well as other people determined to be relevant or connected. In step 1325, external data relevant to the people is determined. For example, external data sources can be consulted to determine the current role of an attendee, prior work history, status information from social or professional networks, credit or other financial information of the attendee or related organization, etc. The external data can be used to generate a rank and score to be assigned to the attendee, a weighting factor for a rank and score to be determined for the meeting, priorities for opportunities with the attendee, or the like.

In step 1330, people are assigned to one or more accounts. An account as used herein generally refers to a collection of information maintained by the organization of the calendar owner. The account may be represented by an actual sales account or other customer/organization profile. Account data can be used to generate a rank and score to be assigned to the attendee, a weighting factor for a rank and score to be determined for the meeting, priorities for opportunities with the attendee, or the like.

In step 1335, a meeting priority is determined. The importance of a meeting can be determined based on the "importance" of the people that attend the meeting. Similarly, the importance of people that attend a meeting can be determined based on the "importance" of the meetings they attend. The importance of people and meetings can further be determined based on content related to the meeting or attendees.

In one embodiment, the meeting gets an initial base score based on the recency of the meeting. One example of a base score can be set as follows:

initialScore=1.0/Math·exp(weeksFromToday/52)

This gives a continuous curve where a meeting that is 52 weeks old is approximately 0.36 and a meeting 0 weeks old is 1.0. Future meeting can have a value greater than 1.

The meeting's initial score can then be altered by how important the meeting is by examining the score of the participants in the meeting. For each participant, an initial score can be set to 1.0 and a final score can be determined using an algorithm that evaluates the score of the meetings the participant attends. Since the definition of the score of the participant depends on the score of the meetings and the score of the meetings depends on the score of the participants, a modified "pageRank" like algorithm can be employed. A pageRank algorithm refers to an iterative algorithm that uses current values of dependent data and arrives at future values for the next iteration.

In one embodiment, a score for a person p can be determined using equation (1) as follows:

$$PR(p) = w + \sum \frac{S_i \to p}{L_i}$$

where w is a damping factor, $S_i \to p$ is the importance of the participant to the meeting, and $L_i$ is a factor whose value is dependent on who else participated in the meeting. FIG. 13 is an illustration of a people-ranking graph in one embodiment.

A damping factor of 0.85 can be used to weigh the current value so the incremental from dependent values adds 0.15 of the score. This damping factor is commonly used for Google's pageRank algorithm and determines the rate of convergence. A convergence threshold of 2% can be used to stop the iterations.

Typically, for 90-1000 calendar entries with 900-2000 participants, a convergence in 4-5 iterations is normal to rank people and/or meetings. FIGS. 15A-15D are graphs illustrating convergence for ranking people and meetings in various embodiments according to the present invention. Once ranks for people and meetings are determined, their respective scores, rankings, or values can be used to people information insight into opportunities.

For example, in step 1340, a meeting list of opportunities is determined. The list of opportunities can include recommended content to review, products that might be relevant to a client meeting, contact information for participants, etc. Referring again to step 1345, a determination can be made that the meeting data refers to an internal meeting. In step 1350, one or more people are determined based on the meeting data similar to step 1320. Organizational information can be used to determine the roles of the attendees, whether they are assigned to particular accounts, or the like.

The importance of the meeting and the attendees can be determined in step 1335 and a list of opportunities determined in step 1340. Accordingly, the calendar owner can be provided with a recommended list of opportunities for each meeting having a determine importance value as indicated above using attendees and the meetings they attend.

C. Views of Opportunities or Recommendations

Figure 16B:
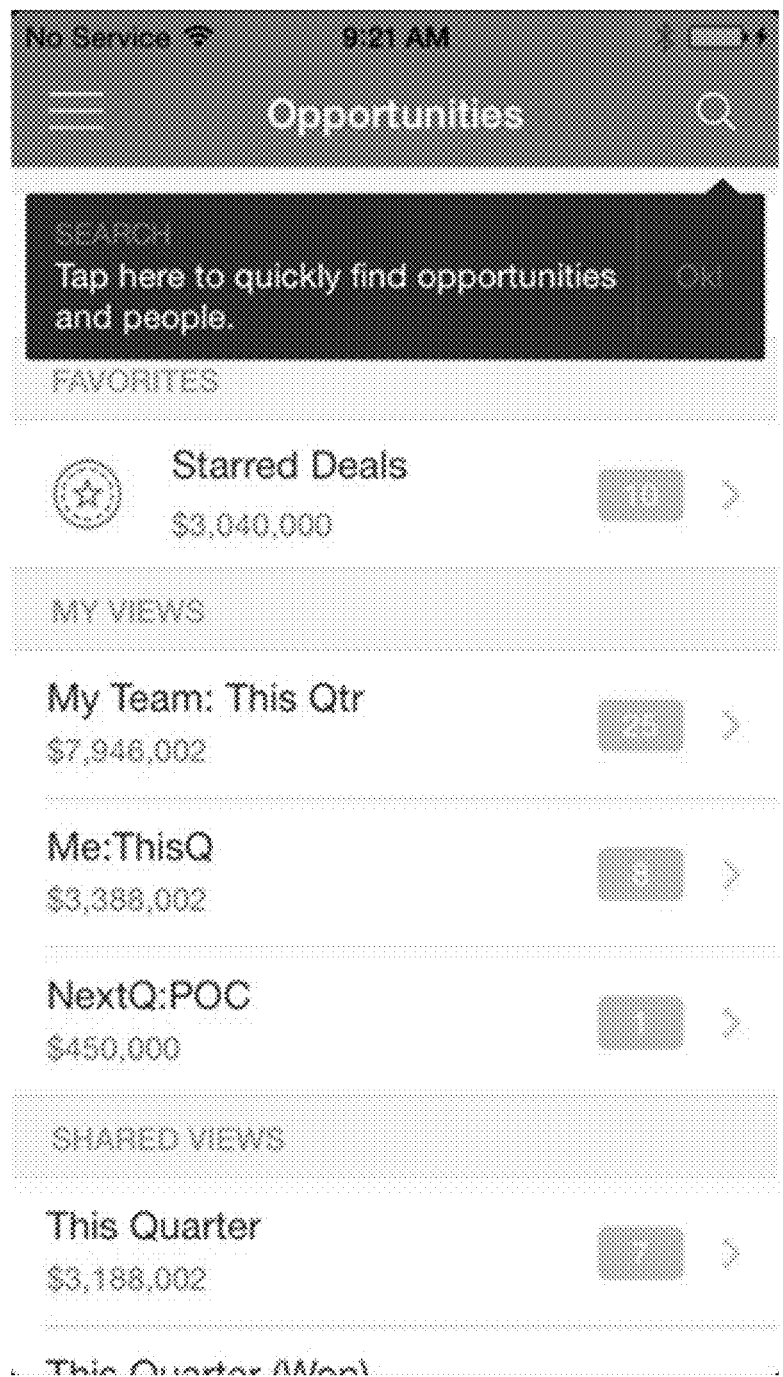

FIGS. 16A-16G are screenshots of user interfaces for conveying calendar analytics on mobile devices in one embodiment according to the present invention. For example, FIG. 16A illustrates a home screen displaying a list of opportunities to a user of a mobile device. The home screen can include one or more user interface elements for managing and navigating the displayed list of opportunities. Various statistics or analytics results can be displayed together with the list of opportunities. In some embodiments, the home screen can provide aging information for opportunities, contact information, social media links, or the like.

Figure 16C:
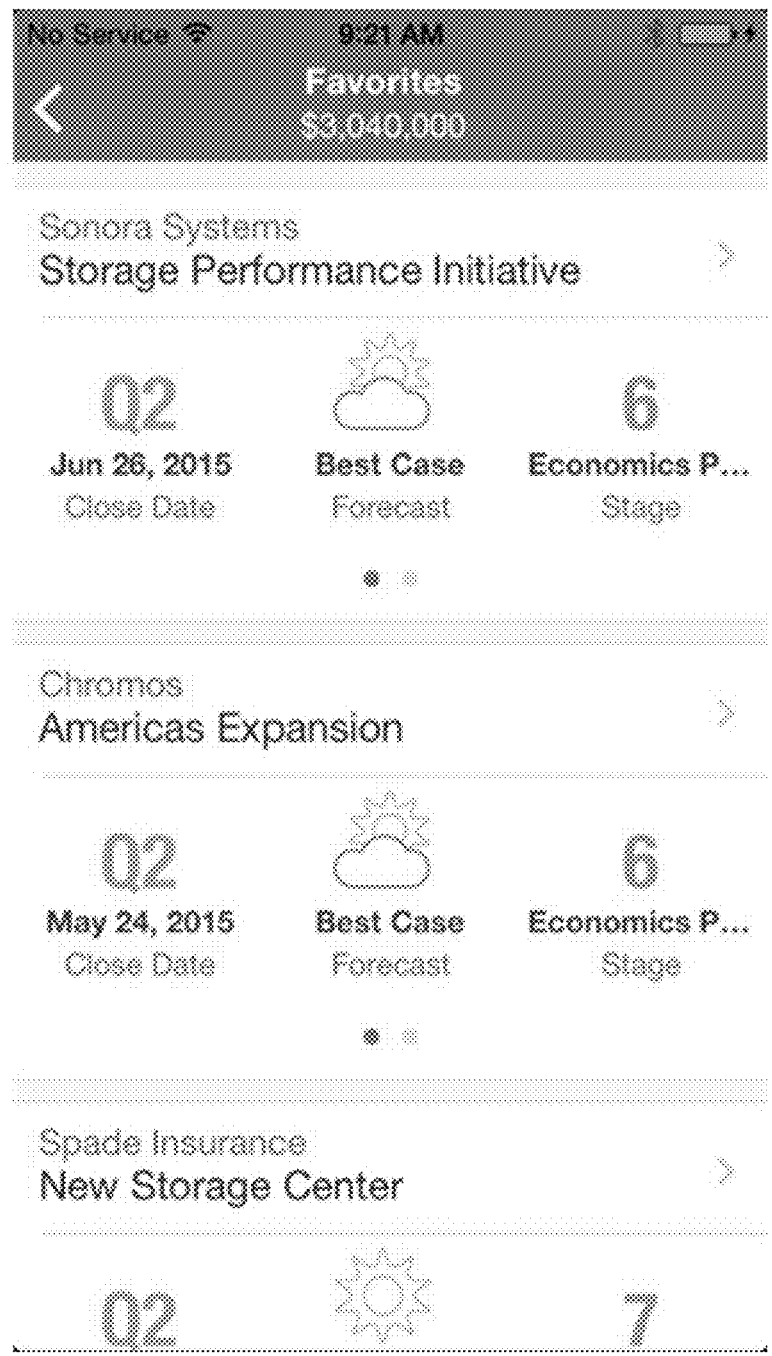

In another example, FIG. 16B illustrates opportunities organized according to criteria, such as favorites, assigned opportunities, shared opportunities, or the like. The organized opportunities can be displayed together with sales information or the like that facilities a user's view of each opportunity. In FIG. 16C, a list of opportunities that have been designed with a user's favorite category are displayed. A favorites list can include when a deal is expected to close and user interface elements for navigating to deal information as well as analytics, such as forecasts and the like.

Figure 16D:
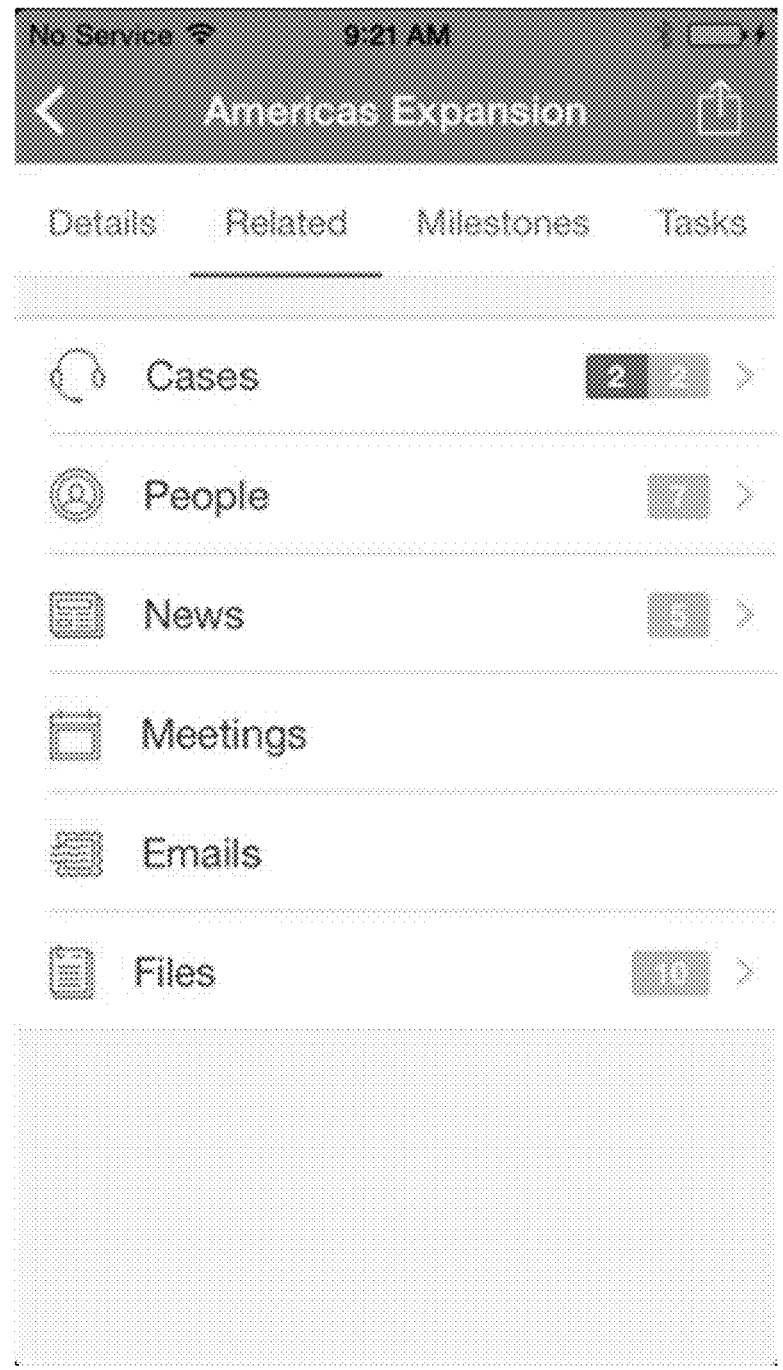
Figure 16E:
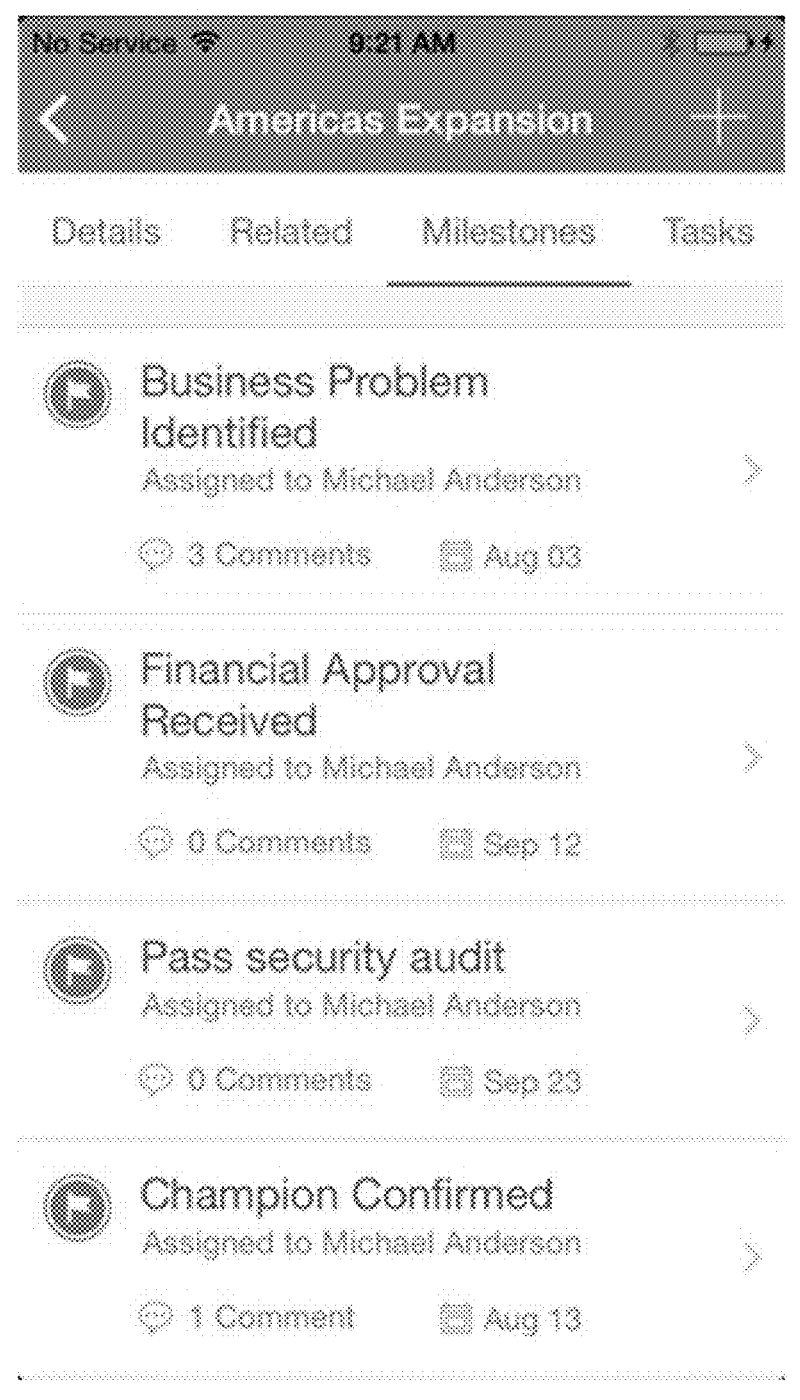
Figure 16F:
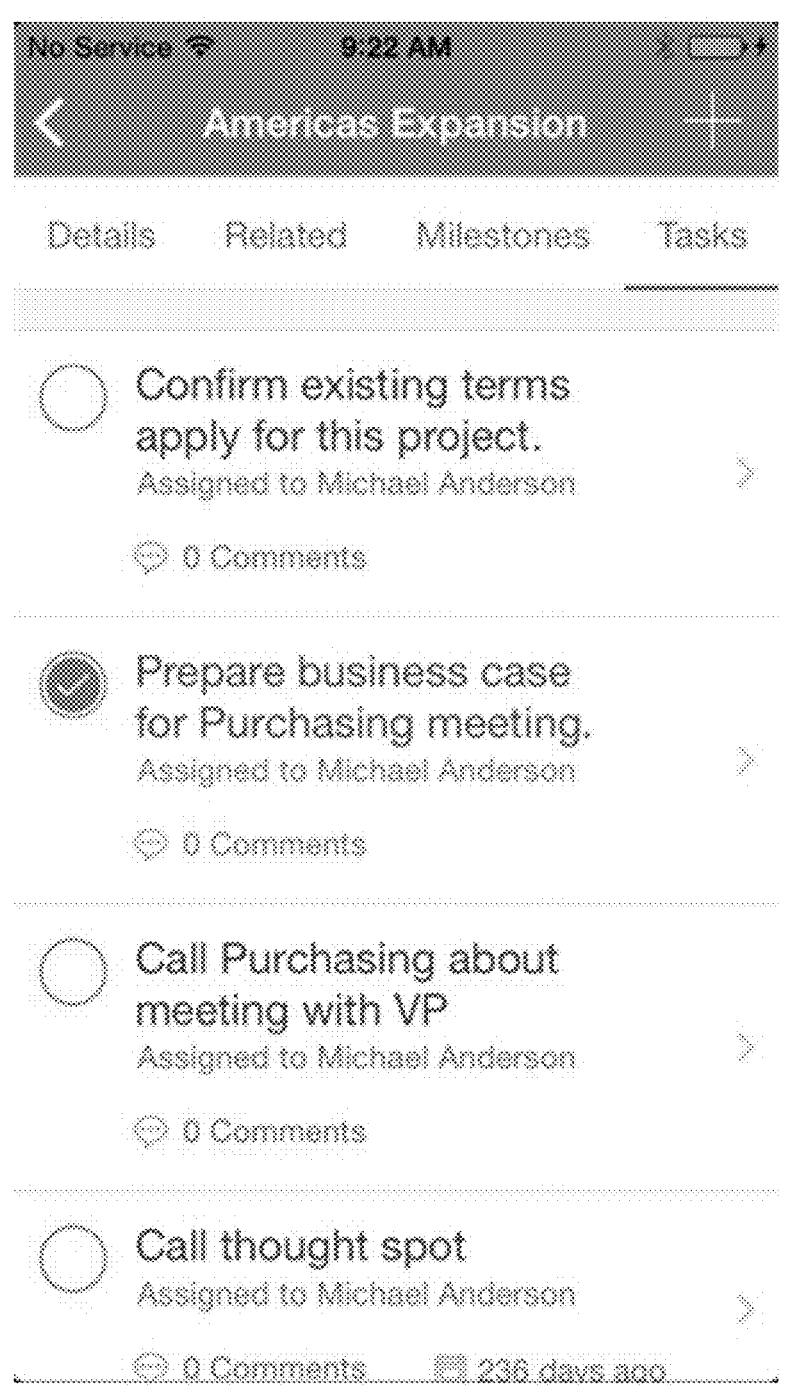

FIG. 16D illustrates connections to a given opportunity. Some examples of connections are cases, people, news, meetings, emails, files, or the like. Information discovery and curation system 300 can determine connections and ascribe values to various entities, such as people and meetings to be able to guide various types of analytics. FIGS. 16E and 16F illustrate milestones and tasks related to the given opportunity. By presenting the milestones and tasks on a user's mobile device, information discovery and curation system 300 can facilitate the user's experience with each opportunity as well as help the user manage all phases of the opportunity.

Figure 16G:
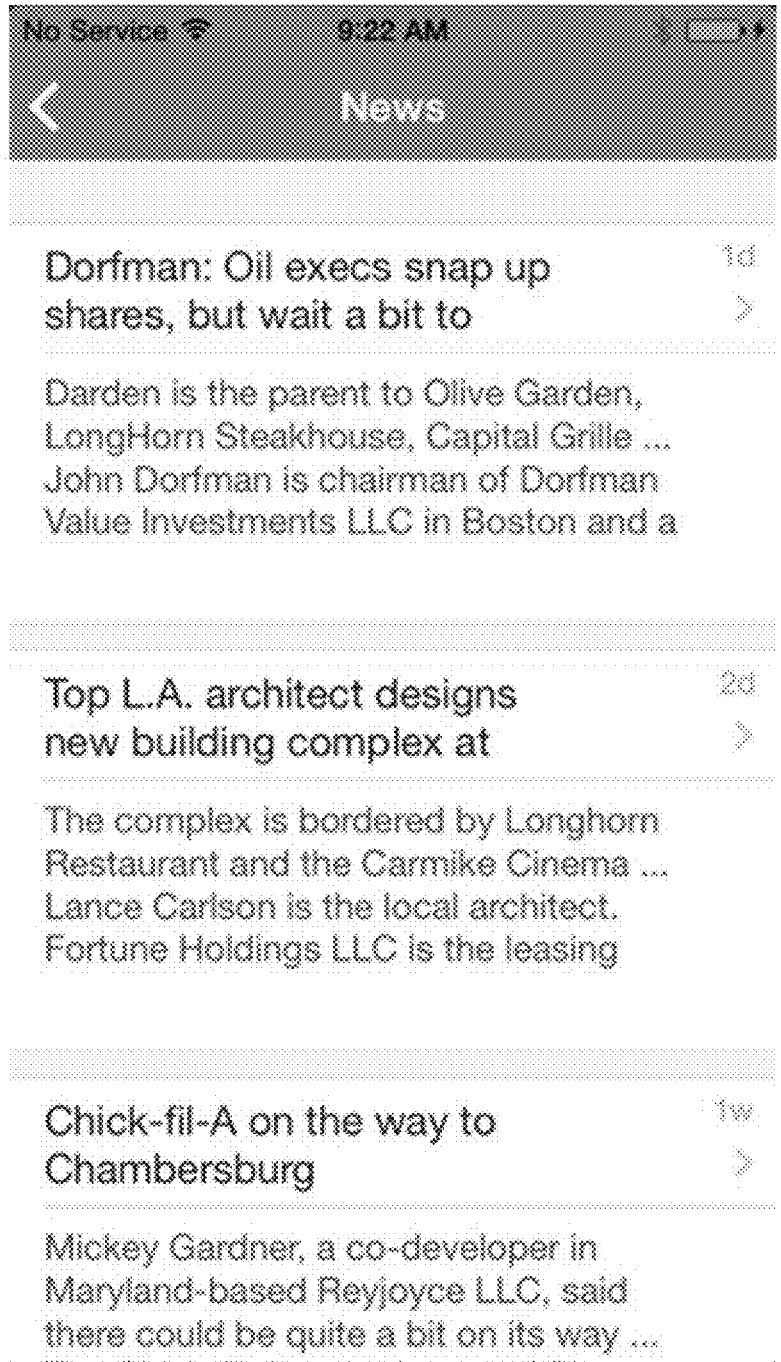

FIG. 16G illustrates how an opportunity can be augmented with news, social media information, and other external resources to assist the user in managing the opportunity. Although news is shown as an example, any type of data source can be used.

IV. Conclusion

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

A. Example Cloud Hardware

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Figure 17:
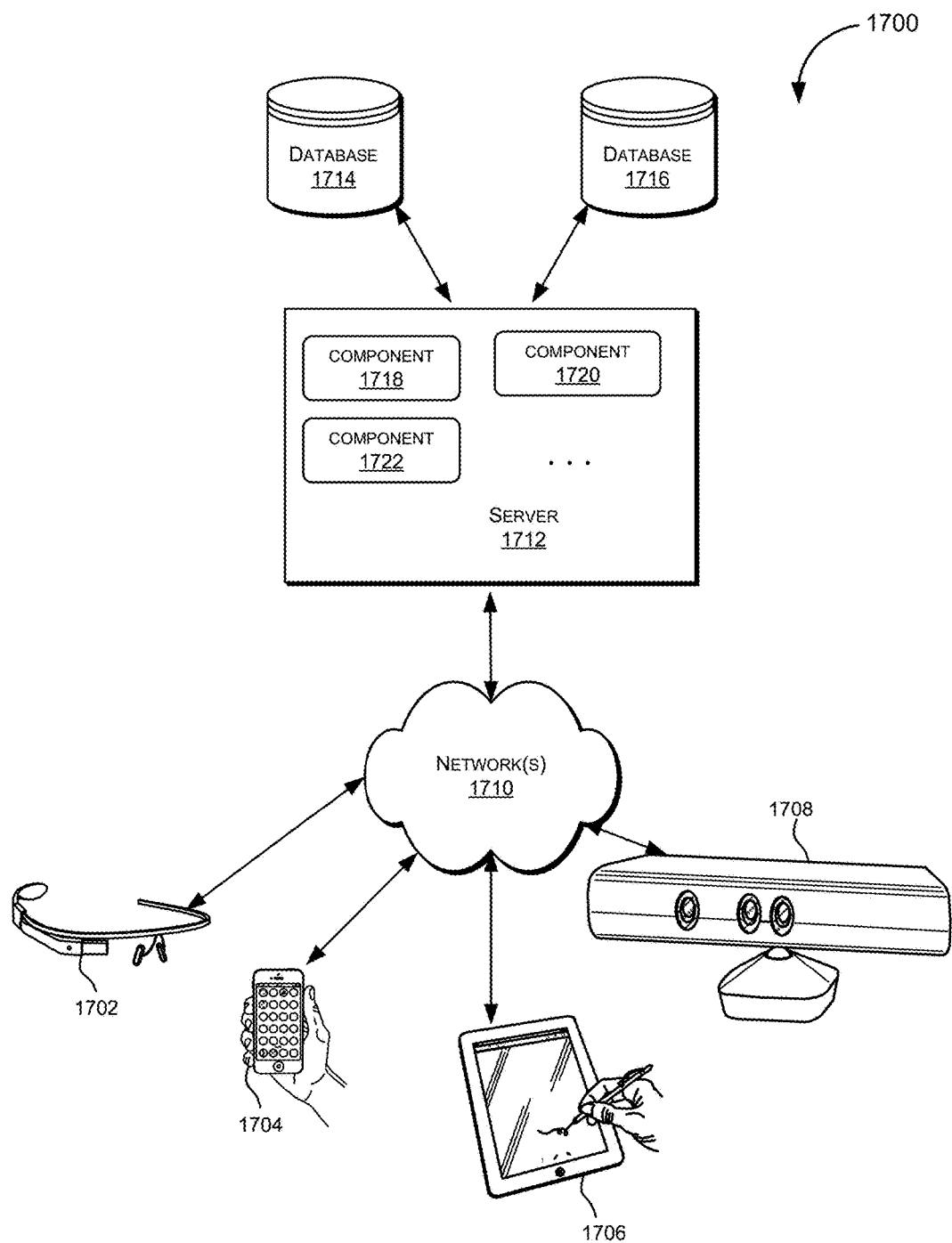
FIG. 17 depicts a simplified diagram of a distributed system for implementing one of the embodiments.

FIG. 17 depicts a simplified diagram of a distributed system 1700 for implementing one of the embodiments. In the illustrated embodiment, distributed system 1700 includes one or more client computing devices 1702, 1704, 1706, and 1708, which are configured to execute and operate a client application such as a web browser, proprietary client (e.g., Oracle Forms), or the like over one or more network(s) 1710. Server 1712 may be communicatively coupled with remote client computing devices 1702, 1704, 1706, and 1708 via network 1710.

In various embodiments, server 1712 may be adapted to run one or more services or software applications provided by one or more of the components of the system. In some embodiments, these services may be offered as web-based or cloud services or under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in the figure, the software components 1718, 1720 and 1722 of system 1700 are shown as being implemented on server 1712. In other embodiments, one or more of the components of system 1700 and/or the services provided by these components may also be implemented by one or more of the client computing devices 1702, 1704, 1706, and/or 1708. Users operating the client computing devices may then utilize one or more client applications to use the services provided by these components. These components may be implemented in hardware, firmware, software, or combinations thereof. It should be appreciated that various different system configurations are possible, which may be different from distributed system 1700. The embodiment shown in the figure is thus one example of a distributed system for implementing an embodiment system and is not intended to be limiting.

Client computing devices 1702, 1704, 1706, and/or 1708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1702, 1704, 1706, and 1708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1710.

Although exemplary distributed system 1700 is shown with four client computing devices, any number of client computing devices may be supported. Other devices, such as devices with sensors, etc., may interact with server 1712.

Network(s) 1710 in distributed system 1700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1710 can be a local area network (LAN), such as one based on Ethernet, Token-Ring and/or the like. Network(s) 1710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1712 may be adapted to run one or more services or software applications described in the foregoing disclosure. For example, server 1712 may correspond to a server for performing processing described above according to an embodiment of the present disclosure.

Server 1712 may run an operating system including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1712 may include one or more applications to analyze and consolidate data feeds and/or event updates received from users of client computing devices 1702, 1704, 1706, and 1708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more databases 1714 and 1716. Databases 1714 and 1716 may reside in a variety of locations. By way of example, one or more of databases 1714 and 1716 may reside on a non-transitory storage medium local to (and/or resident in) server 1712. Alternatively, databases 1714 and 1716 may be remote from server 1712 and in communication with server 1712 via a network-based or dedicated connection. In one set of embodiments, databases 1714 and 1716 may reside in a storage-area network (SAN). Similarly, any necessary files for performing the functions attributed to server 1712 may be stored locally on server 1712 and/or remotely, as appropriate. In one set of embodiments, databases 1714 and 1716 may include relational databases that are adapted to store, update, and retrieve data in response to SQL-formatted commands.

B. Example Client Hardware

Figure 18:
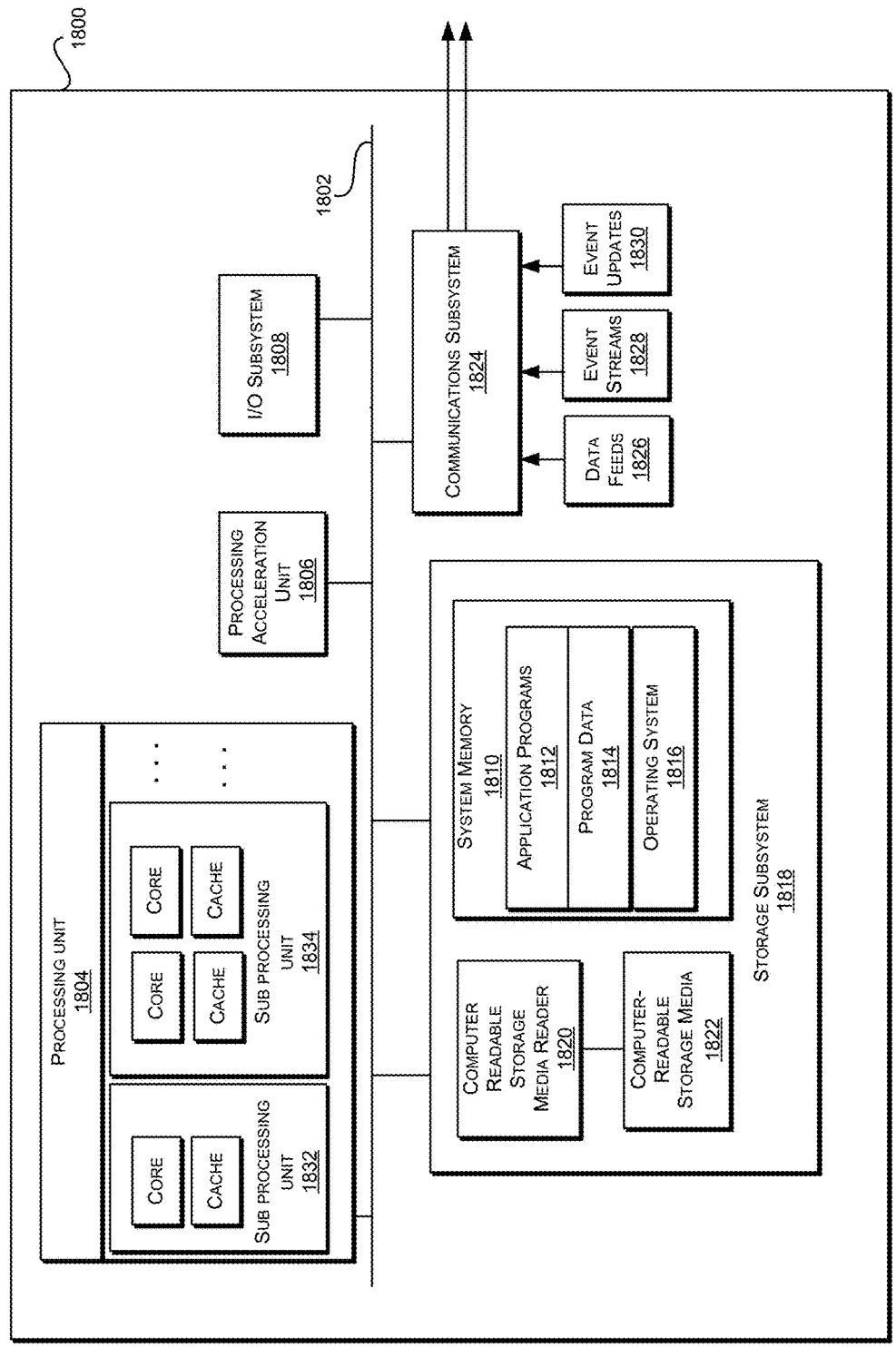
FIG. 18 illustrates an exemplary computer system, in which various embodiments of the present invention may be implemented.

FIG. 18 illustrates an exemplary computer system 1800, in which various embodiments of the present invention may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that comprises software elements, shown as being currently located within a system memory 1810. System memory 1810 may store program instructions that are loadable and executable on processing unit 1804, as well as data generated during the execution of these programs.

Depending on the configuration and type of computer system 1800, system memory 1810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 may include multiple different types of memory, such as static random access memory (SRAM) or dynamic random access memory (DRAM). In some implementations, a basic input/output system (BIOS), containing the basic routines that help to transfer information between elements within computer system 1800, such as during start-up, may typically be stored in the ROM. By way of example, and not limitation, system memory 1810 also illustrates application programs 1812, which may include client applications, Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry®18 OS, and Palm® OS operating systems.

Storage subsystem 1818 may also provide a tangible computer-readable storage medium for storing the basic programming and data constructs that provide the functionality of some embodiments. Software (programs, code modules, instructions) that when executed by a processor provide the functionality described above may be stored in storage subsystem 1818. These software modules or instructions may be executed by processing unit 1804. Storage subsystem 1818 may also provide a repository for storing data used in accordance with the present invention.

Storage subsystem 1800 may also include a computer-readable storage media reader 1820 that can further be connected to computer-readable storage media 1822. Together and, optionally, in combination with system memory 1810, computer-readable storage media 1822 may comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

What is claimed is:

1. A method for ranking and scoring meetings, the method comprising:

retrieving, by a content analytics engine as a cloud service executed by a processor of a computer system, calendar data from a data source associated with an electronic calendar and email system, wherein the calendar data includes a plurality of meetings, each meeting associated with a plurality of attributes, wherein the plurality of attributes includes information identifying a number of attendees, an agenda, and one or more attachments;

receiving, by the content analytics engine as the cloud service executed by the processor of the computer system, a request for analyzing a meeting and a plurality of attendees for the meeting;

determining, by the content analytics engine as the cloud service executed by the processor of the computer system, importance of the meeting and importance of each of the attendees of the meeting based on values of the plurality of attributes associated with the meeting, including assigning by the content analytics engine an initial meeting sore to the meeting based on a recency of the meeting as a prior meeting score representing an initial importance of the meeting, assigning by the content analytics engine an initial attendee score to each of the attendees of the meeting as a prior attendee score representing an initial importance of the attendee with respect to the meeting, iteratively performing by the content analytics engine, until a predetermined convergence condition is satisfied, calculating a current meeting score based on the prior meeting score and the prior attendee score of each of the attendees of the meeting using a predetermined meeting scoring algorithm, wherein the current meeting score is utilized as the prior meeting score for a next iteration, for each of the attendees, calculating a current attendee score based on the prior attendee scores of the attendees and the prior meeting score of the meeting using a predetermined attendee scoring algorithm, wherein the current attendee score is utilized as the prior attendee score for a corresponding attendee for the next iteration, determining whether the predetermined convergence condition has been satisfied, including determining whether a first difference between the current meeting score and the prior meeting score is less than a first predetermined threshold, and determining whether a second difference between the current attendee score and the prior attendee score of each of the attendees of the meeting is less than a second predetermined threshold, terminating the iteration in response to determining that the predetermined convergence condition has been satisfied;

determining, by the content analytics engine as the cloud service executed by the processor of the computer system, one or more opportunities for one or more of the attendees in the plurality of attendees based on a latest current meeting score representing the importance of the meeting and a latest current attendee score representing the importance of each of the attendees of the meeting; and sending, by the content analytics engine as the cloud service executed by the processor of the computer system, the one or more opportunities to the one or more attendees in the plurality of attendees.

2. The method of claim 1 wherein determining the importance of the meeting comprises:

determining whether a first attendee is part of a first organization;

determining the importance of the first attendee utilizing information about the first organization.

3. The method of claim 1 wherein determining the importance of the meeting comprises:

determining whether a first attendee is part of a first organization; and determining the importance of the first attendee utilizing information about one or more organizational roles of the first attendee.

4. The method of claim 1, wherein the importance of each attendee in the plurality of attendees is determined further based, at least in part, on importance of one or more electronic communications associated with the plurality of attendees, importance of the one or more electronic communications determined based, at least in part, on importance of at least one of the plurality of attendees to the one or more electronic communications as sender or recipient.

5. The method of claim 1 wherein determining the one or more opportunities for the one or more of the attendees in the plurality of attendees using the importance of the meeting comprises:

determining one or more actions recommended to be performed by a first attendee with respect to a second attendee prior to the meeting.

6. The method of claim 1 wherein determining the one or more opportunities for the one or more of the attendees in the plurality of attendees using the importance of the meeting comprises:

determining a priority with respect to each opportunity in the one or more opportunities.

7. The method of claim 1 further comprising:

packaging data that supports the one or more opportunities from one or more data sources into a package, wherein the package formats the data appropriate for a mobile device; and wherein sending the one or more opportunities to the one or more attendees in the plurality of attendees comprises sending the package to a mobile device of each of the one or more attendees.

8. A non-transitory machine-readable medium having instructions stored therein, which when executed by a processor, cause the processor to perform a method of ranking and scoring electronic meetings that have been scheduled via an electronic calendar system, the method comprising:

retrieving, by a content analytics engine as a cloud service executed by a processor of a computer system, calendar data from a data source associated with an electronic calendar and email system, wherein the calendar data includes a plurality of meetings, each meeting associated with a plurality of attributes, wherein the plurality of attributes includes information identifying a number of attendees, an agenda, and one or more attachments;

receiving, by content analytics engine as the cloud service executed by the processor of the computer system, about a request for analyzing a meeting and a plurality of attendees for the meeting;

determining, by content analytics engine as the cloud service executed by the processor of the computer system, importance of the meeting and importance of each of the attendees of the meeting based on values of the plurality of attributes associated with the meeting, including assigning by the content analytics engine an initial meeting sore to the meeting based on a recency of the meeting as a prior meeting score representing an initial importance of the meeting, assigning by the content analytics engine an initial attendee score to each of the attendees of the meeting as a prior attendee score representing an initial importance of the attendee with respect to the meeting, iteratively performing by the content analytics engine, until a predetermined convergence condition is satisfied, calculating a current meeting score based on the prior meeting score and the prior attendee score of each of the attendees of the meeting using a predetermined meeting scoring algorithm, wherein the current meeting score is utilized as the prior meeting score for a next iteration, for each of the attendees, calculating a current attendee score based on the prior attendee scores of the attendees and the prior meeting score of the meeting using a predetermined attendee scoring algorithm, wherein the current attendee score is utilized as the prior attendee score for a corresponding attendee for the next iteration, determining whether the predetermined convergence condition has been satisfied, including determining whether a first difference between the current meeting score and the prior meeting score is less than a first predetermined threshold, and determining whether a second difference between the current attendee score and the prior attendee score of each of the attendees of the meeting is less than a second predetermined threshold, terminating the iteration in response to determining that the predetermined convergence condition has been satisfied:
  determining, by the content analytics engine as the cloud service executed by the processor of the computer system, one or more opportunities for one or more of the attendees in the plurality of attendees based on a latest current meeting score representing the importance of the meeting and a latest attendee score representing the importance of each of the attendees of the meeting; and
  sending, by the content analytics engine as the cloud service executed by the processor of the computer system, the one or more opportunities to the one or more attendees in the plurality of attendees.

9. The machine-readable medium of claim 8, wherein determining the importance of the meeting comprises:
  determining whether a first attendee is part of a first organization;
  determining the importance of the first attendee utilizing information about the first organization.

10. The machine-readable medium of claim 8, wherein determining the importance of the meeting comprises:
  determining whether a first attendee is part of a first organization; and
  determining the importance of the first attendee utilizing information about one or more organizational roles of the first attendee.

11. The machine-readable medium of claim 8, wherein the importance of each attendee in the plurality of attendees is determined further based, at least in part, on importance of one or more electronic communications associated with the plurality of attendees, importance of the one or more electronic communications determined based, at least in part, on importance of at least one of the plurality of attendees to the one or more electronic communications as sender or recipient.

12. The machine-readable medium of claim 8, wherein determining the one or more opportunities for the one or more of the attendees in the plurality of attendees using the importance of the meeting comprises:
  determining one or more actions recommended to be performed by a first attendee with respect to a second attendee prior to the meeting.

13. The machine-readable medium of claim 8, wherein determining the one or more opportunities for the one or more of the attendees in the plurality of attendees using the importance of the meeting comprises:
  determining a priority with respect to each opportunity in the one or more opportunities.

14. The machine-readable medium of claim 8, wherein the method further comprises:
  packaging data that supports the one or more opportunities from one or more data sources into a package, wherein the package formats the data appropriate for a mobile device; and wherein sending the one or more opportunities to the one or more attendees in the plurality of attendees comprises sending the package to a mobile device of each of the one or more attendees.

15. A data processing system, comprising:
  a processor; and
  a memory coupled to the processor to store instructions, which when executed by the processor, cause the processor to perform a method of ranking and scoring electronic meetings that have been scheduled via an electronic calendar system, the method including
    retrieving, by a content analytics engine as a cloud service executed by the processor, calendar data from a data source associated with an electronic calendar and email system, wherein the calendar data includes information identifying a plurality of meetings, each meeting associated with a plurality of attributes, wherein the plurality of attributes for each meeting includes a number of attendees, an agenda, and one or more attachments;
    receiving, by the content analytics engine as the cloud service executed by the processor request for analyzing a meeting and a plurality of attendees for the meeting;
    determining, by the content analytics engine as the cloud service executed by the processor, importance of the meeting and importance of each of the attendees of the meeting based on values of the plurality of attributes associated with the meeting, including
      assigning by the content analytics engine an initial meeting sore to the meeting based on a recency of the meeting as a prior meeting score representing an initial importance of the meeting,
      assigning by the content analytics engine an initial attendee score to each of the attendees of the meeting as a prior attendee score representing an initial importance of the attendee with respect to the meeting,
      iteratively performing by the content analytics engine, until a predetermined convergence condition is satisfied,
        calculating a current meeting score based on the prior meeting score and the prior attendee score of each of the attendees of the meeting using a predetermined meeting scoring algorithm, wherein the current meeting score is utilized as the prior meeting score for a next iteration,
        for each of the attendees, calculating a current attendee score based on the prior attendee scores of the attendees and the prior meeting score of the meeting using a predetermined attendee scoring algorithm, wherein the current attendee score is utilized as the prior attendee score for a corresponding attendee for the next iteration,
        determining whether the predetermined convergence condition has been satisfied, including
          determining whether a first difference between the current meeting score and the prior meeting score is less than a first predetermined threshold, and
          determining whether a second difference between the current attendee score and the prior attendee score of each of the attendees of the meeting is less than a second predetermined threshold,
        terminating the iteration in response to determining that the predetermined convergence condition has been satisfied:
    determining, by the content analytics engine as the cloud service executed by the processor, one or more opportunities for one or more of the attendees in the plurality of attendees based on a latest current meeting score representing the importance of the meeting and a latest current attendee score representing the importance of each of the attendees of the meeting; and sending, by the content analytics engine as the cloud service executed by the processor, the one or more opportunities to the one or more attendees in the plurality of attendees.

16. The system of claim 15, wherein determining the importance of the meeting comprises:
determining whether a first attendee is part of a first organization;
determining the importance of the first attendee utilizing information about the first organization.

17. The system of claim 15 wherein determining the importance of the meeting comprises:
determining whether a first attendee is part of a first organization; and
determining the importance of the first attendee utilizing information about one or more organizational roles of the first attendee.

18. The system of claim 15, wherein the importance of each attendee in the plurality of attendees is determined further based, at least in part, on importance of one or more electronic communications associated with the plurality of attendees, importance of the one or more electronic communications determined based, at least in part, on importance of at least one of the plurality of attendees to the one or more electronic communications as sender or recipient.

19. The system of claim 15, wherein determining the one or more opportunities for the one or more of the attendees in the plurality of attendees using the importance of the meeting comprises:
determining one or more actions recommended to be performed by a first attendee with respect to a second attendee prior to the meeting.

20. The system of claim 15, wherein determining the one or more opportunities for the one or more of the attendees in the plurality of attendees using the importance of the meeting comprises:
determining a priority with respect to each opportunity in the one or more opportunities.

* * * * *